(12) United States Patent
Dutta

(10) Patent No.: US 10,841,563 B1
(45) Date of Patent: Nov. 17, 2020

(54) SMART SENSOR AND ITS SYSTEM FOR AUTONOMOUS SYSTEM

(71) Applicant: Achyut Kumar Dutta, Sunnyvale, CA (US)

(72) Inventor: Achyut Kumar Dutta, Sunnyvale, CA (US)

(73) Assignee: Banpil Photonics, Inc., Santa Clara, CA (US)

(*) Notice: Subject to any disclaimer, the term of this patent is extended or adjusted under 35 U.S.C. 154(b) by 166 days.

(21) Appl. No.: 15/814,271

(22) Filed: Nov. 15, 2017

Related U.S. Application Data

(60) Provisional application No. 62/579,518, filed on Oct. 31, 2017, provisional application No. 62/572,547, filed on Oct. 15, 2017.

(51) Int. Cl.
| | |
|---|---|
| H04N 13/254 | (2018.01) |
| H04N 13/204 | (2018.01) |
| H04N 13/271 | (2018.01) |
| B25J 9/16 | (2006.01) |
| G05D 1/00 | (2006.01) |

(52) U.S. Cl.
CPC ......... H04N 13/254 (2018.05); H04N 13/204 (2018.05); H04N 13/271 (2018.05); *B25J 9/163* (2013.01); *B25J 9/1697* (2013.01); *G05D 1/0088* (2013.01); *H04N 2213/001* (2013.01)

(58) Field of Classification Search
CPC ... H04N 13/254; H04N 13/204; H04N 13/271
See application file for complete search history.

(56) References Cited

U.S. PATENT DOCUMENTS

2014/0152839 A1* 6/2014 Menon .................. H04N 5/332
348/164

* cited by examiner

*Primary Examiner* — Girumsew Wendmagegn

(57) ABSTRACT

This invention relates to a sensor and sensor platform, for an autonomous system. The sensor and its platform sense, perform signal or data processing, and make the decision locally at the point of sensing. More specifically, the sensor along with its platform simulates the human-like or human capacity to make decisions by combing the data from several sensors that detect different data sets, and combine them in a series of data processes that allows autonomous decisions to be made. Additionally, the sensor platform combines multiple sensors in one metasensor with the functionality of multiple sensors placed on a common carrier or platform.

20 Claims, 30 Drawing Sheets

MxN Multi-Modalites Sensor Array

SMART SENSOR AND ITS SYSTEM FOR AUTONOMOUS SYSTEM

CROSS REFERENCE TO RELATED APPLICATIONS

This application claims priority to U.S. Provisional Application No. 62/579,518 filed on Oct. 31, 2017, and also Provisional Application No. 62/572,547 filed on Oct. 15, 2017. This application claims the benefit of the Provisional's filing date under 35 U.S.C. § 119 (e). This present application hereby claims the benefit of these earlier filing dates under 35 U.S.C. § 120.

FIELD OF INVENTIONS

This invention relates to a sensor and its associated sensor platform, comprises a single sensor (herein after mentioned as Meta Sensor) or multiple sensor devices, that can provide different sets of functional data, and processing of the functional data from a Meta Sensor into aggregated information either pre-processing and/or combination of that information in the sensor and/or a part/whole processed off-chip or on-chip to get data which can provide a decision from processed data. The decision and/or decision matrix created in real-time or pseudo-real-time from various functionality are done using a learning framework for evaluating the information to make a single or multiple decisions based on each functionality and/or single key decision which may be bound by certain conditions. This invention pertains to the functions and operations of any autonomous system including, but not limited to those used for aerial, ground, sea, space and/or aquatic applications. It also includes autonomous systems used in robotic applications including but not limited to consumer and industrial robotics, which incorporate sensors or sensing apparatus for the purpose of sensing, detecting, vision, and decisions making like human (i.e. behavior, prediction, perception, cognitive capability etc.).

BACKGROUND OF THE INVENTION

This invention pertains to the functions and operations of any autonomous system including but not limited to those used for aerial, ground, space and aquatic applications. It also includes but not limited to autonomous systems used in robotic applications including consumer and industrial robotics, which incorporate sensors or sensing apparatus for the purpose of sensing, detecting, vision, and decisions.

Today's autonomous systems (e.g. autonomous vehicle) operate through the use of numerous sensors of different modalities to cover various modes of sensing and detection across various spectrums of electromagnetic waves including light, radar, ultrasonic waves and others. Each sensor individually performs/senses a specific function in the operation of the autonomous system. That functional information generating from each sensor are processed separately, and/or sends information to a common platform having a processor to process the sensor information and most of the cases, the process is done off-chip and/or the electronic means is located far away or on a separate system from the sensor. A first significant problem is that each sensor in its independent function generates its own unique data stream of sensing and detection information, which are individually/separately processed from end to end by the autonomous system. Put together as a collection of sensors for sensing multiple modalities, and also accounting for multiple sensors of the same modalities, and for each generating independent data streams, a massive amount of data streams are generated for a function or various functions and operation of the autonomous system, which may not be capable of successfully and efficiently processing such information in a timely manner to be useful to the autonomous system without the use of extremely powerful computer systems equivalent to supercomputers. The result is that decisions that are dependent on the processing of the independent data streams take time that creates latency in making decision from each sensing information due to the high amount of hardware computation resources that are necessary to perform the computational intensive processing.

In addition to the independent function and operation of each sensor, sometimes the sensors overlap in the sensing and detection functionality of the autonomous system. This is particularly with regard to sensors of different modalities sensing and detecting the same scene or observation target, but each independently generating data streams that are different due to their modalities. In order to make decisions, autonomous systems sometimes have to fuse the data streams of the various sensors in a post-processed scheme away from the point of sensing and detection. This data must be processed independently and separately at first, and thereafter utilized by the autonomous system in making determinations (or a decision) on the data to conclude what was observed or sensed, and to then synthesize a decision for which the autonomous system can act upon. This is equivalent to a post-processed data stream fusion or sensor fusion, which attempts to reconcile the differences from the various sensing modalities. Due to the difference in modalities of the various sensor systems, a second problem is that the interpretation of the data streams and determination of what is observed can be conflicted between the sensor modalities, which thereafter can result in the incorrect synthesis of a decision by the autonomous systems. Both first and/or second problems gets more serious if the autonomous systems are in motion and the latency and/or the differences and/or conflicts in decisions makes it difficult to make a final or aggregated decision in real time conditions and therefore, in some cases, the autonomous system cannot perform its tasks in a fully autonomous mode and requires human access to make the decision in real time. Conflicts in the accurate interpretation and determination of the various sensor data streams can result in ultimate conflicting decisions by the autonomous system. When a conflict occurs, the autonomous system may catastrophically fail to make timely decisions on critical operations especially in situations where the autonomous system is in motion or in a complex maneuver where quick decisions are necessary, and failures can result in accidents and even fatalities.

Further, despite the availability of various sensor modalities and multiple sensors, the sensing and detection capabilities lack the ability of human vision, sensing, and detection, which is not only the sum of sensors, but also the ability to combine the various data streams intelligently and process them in such a manner as to gain the capability of human perception, which helps humans to not only resolve conflicts in vision, sensing, and detection, but also to do it quickly. It is highly desirable to have a sensor system which could process the sensor information and provide the decision to act in almost real time or close to real time.

BRIEF SUMMARY OF INVENTION

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

It is an object of this invention to provide a sensor or a sensor system that will not have any limitation or limitations (a) of its hardware and and sensors that create a critical sensing gaps in their independent operation. (b) that relates to the massive data, generated with each sensing mode that is individually and independently processed, (c) on decisions that are made and are arrived at slowly through brute force serial computation that is prone to errors, mistakes and conflicts due to the massive data that must be processed, and it is brute force because no intelligence is used. (For example, the same data from multiple sensors can be identical, but it is still repeatedly processed for as many times as it appears in the data stream. This lends itself to errors and mistakes that are duplicated or replicated many times over due to the inability for a learning capability, and since decisions are only as good as the quality of data available. If one type of sensor has a limitation, it will be replicated in any number of the same modality of sensors that generates a data stream for the same observed scene), and (d) interpretation of the data for intelligence that contributes to a lack of a mechanism for resolving conflicts and making judgments and decisions that are otherwise quick and simple to the human being i.e. perception.

Accordingly, it is an object of the invention to provide a Meta sensor or meta-sensor system that combines the data from several sensors and applies the data to a series of data processes that allows autonomous decisions to be made from the sensed data.

Accordingly, it is an object of this invention to provide a system that allows for the simulation of the human capacity or capability to make decisions by creating a system that takes several different sources of information, sensors, and combine the data into a fused dataset, process the data and make informed decisions with the data. It is an object of this invention to use this system and methods to allow for autonomous systems (e.g. autonomous vehicles), to operate in aerial, ground, space and aquatic applications.

According to this invention, it is an object of this invention to provide a novel sensor capable to sense multiple functions or modalities, at almost Realtime whether the objects to be sensed or sensor is located on the autonomous system (e.g. autonomous vehicle), is in motion or fixed with respect to each other. These multi-modalities sensing are required for the autonomous system (e.g. autonomous vehicle) including, but not limited to aerial, automotive and robotics. The multi-modal functionalities can be sensed by using the sensor itself, or by using it with associated means, or combination thereof. The sensing multi-modal functionalities are feeding to the autonomous system (e.g. autonomous vehicle) for making a decision and the information can be transmitted to the associated means that control the autonomous system (e.g. autonomous vehicle herein sometimes mentioned simply as vehicle) motion by using wired, or wireless. The information can be also displayed to a display and/or audio means, located in the vehicle and visible to an occupant in the vehicle, and/or capable to create the audio message, and/or to connect a system located in the vehicle to show the information in real time, and/or to connect to the communications means/device (e.g., a laptop, a cell phone, a mobile device) or data device (e.g., PDA) to different peripheral devices (e.g., displays, input devices, external storage entities, etc.) and networks (e.g., IP network, vehicle networks either intranet or internet to outside).

It is an object of this invention to combine the capabilities of two or more sensors of the same or different modalities into a novel single sensor or a meta-sensor. The resulting monolithic sensor combines a data stream from multiple sensors into one sensor at the point of sensing and detection in a process called preprocessed sensor fusion. This enables to simplify the data stream of multimodalities of sensing and/or detection information from observing the same scene by multiple sensing modalities and eliminate a high volume of data that is transmitted/derived from each sensor in separate data streams. According to this invention, the result/outcome will be a dramatic reduction in the hardware computational resources required to process the combined monolithic sensor data stream. In addition, the preprocessing of the data stream by combining them at the point of sensing and detection will eliminate the conflicts in sensed and observed data by resolving any such conflicts during preprocessing. According to this invention, the result will be the elimination of sensor generated conflicts since the simultaneously combined data stream will have already synthesized a decision on the observed scene; as such the autonomous system failures due to conflicts in decisions will also be eliminated.

Furthermore, it is also an object of this invention to the reduction in hardware computation requirements and the elimination of conflicts, that it will exponentially increase the speed of decision making by the autonomous system. According to this invention, the ability to make quick decisions will enable the autonomous systems to make decisions in real-time like human beings. This will facilitate capabilities for sensing, detecting, and/or quick decision making, or combination thereof, to react to spontaneous situations and especially when autonomous systems are in motion where the reaction time available is limited for safely responding to any given situation.

Additionally, it is an object of this invention in the preferred embodiment, the preprocessing of the data stream at the point of sensing will allow for the embedding of meta information that will provide for the aggregation of data streams from various sensing modalities with some/full intelligence to be able to synthesize more value-added information from the sensors and the decisions that can be inferred from that information in the same way as humans utilize perception to make quick decisions. The meta-information or data stream from a meta-sensor, after processing of which provide a function or attributes equivalent to a human perception. Accordingly, this information may be transmitted to an intelligent decision framework within a meta sensor or within a meta sensor system, incorporating with a machine learning techniques/machine trained model to make judgments and decisions on an observed scene in the same way that a human being uses perception and intuition to make decisions on aggregated data from various human senses.

It is an object of this invention to provide the ability to obtain the functionality of multiple sensors in one meta-sensor or multiple sensors, placed on a common carrier or platform. Accordingly, according to this invention, by using sensor fusion of the different sensor data streams, the monolithic sensor will simultaneously process multiple sensing modality data streams and combine them into one data stream in a preprocessing scheme at the point of sensing, on-sensor, or on-chip. Accordingly, this capability enables the elimination of conflicts, institutes quick decisions and/or emulate the ability to aggregate data, or combination thereof, for the type of decisions equivalent to human being perception in real-time.

It is an object of this invention to provide a smart sensing system comprising a single sensor, or meta sensor, or multiple sensors either located a part/whole to its vehicle, or rest of the part/whole is located to the distant location either connected by wired or wireless (e.g. private network, secured network), electronic means which include but not limited to, sensor signal processing unit and communication device/means which could be a part of the sensor system. The communication means are either connected to the sensor system via wire or wireless via standard network or proprietary network (e.g. Bluetooth, Wi-Fi, wireless, or wired). In another embodiment, the communication device/means may be located in the vehicle whole, and/or part may be located at the distant location and communicated using the private or public network. In another embodiment, the smart sensing system comprising of the meta sensor, associated electronics means/devices can be also located on the common platform, whereby each components/devices are placed on the common carrier so that all processing can be done in real time. The common platform can be located locally on the sensing system itself or located partially or wholly to the location, or in close proximity to the sensing system. The decision can be sent to a main system or an associated system or a centralized decision system in which the meta sensor system is embedded or a control system via internal network, private and/or proprietary network, to act for action for vehicle.

It is an object of this invention, whereby, the common platform is used to place the main sensor capable to sense multimodalities sensing (e.g. image, distances, mapping) and associated devices close to each other or made on the same devices (e.g. monolithically), or hybridity integrated or made on the common platform, or combination thereof. In the preferred embodiment, the common platform can supply the power, and/or are connected to each device wherein the each device is are interconnected by electrically or optically, or combinations thereof through wire or wireless, or a combination thereof. The preprocessed or post-processed data can be sent to the communication devices and/or the main system/control system via wired or wireless using the private or proprietary network.

In an alternative embodiment, single or multiple sensors can be on a common carrier, wherein single or multiple sensors, and/or the electronic means, are located on it, or the sensor or electronic means can be located in close proximity and connected to the carrier by wireless connection (e.g. Bluetooth, WiFi). In another embodiment, the common carrier can supply the power to the sensor/multiple sensor, electronic means (if located on it), interconnecting the meta sensor and/or the devices, and/or process the data received from each sensor. Further, in an another embodiment, the communication device can seat on the carrier to get preprocessed/postprocessed information and/or is located close proximity or in the place, visible to the operator.

In another embodiment, the smart meta sensing scheme/system provides a set of standard modular connectors for a wide variety of peripheral systems. The smart meta sensor system includes a USB hub subsystem having a set of USB ports and controller for managing connections to USB-capable devices. The smart metasensing system also includes a physical network connection (e.g., Ethernet) for connecting to IP networks, for example. The USB and/or the network connection facilitate interconnecting one device (e.g. mobile, fixed) to another through the smart meta sensing system, and/or through multiple systems.

It is an object of this invention in an another embodiment, to provide an sensing scheme for autonomous systems which can be implemented from the ground-up (i.e. natively) as a novel hardware-based sensor with natively implemented sensor processing and machine learning model or machine learning model generation capabilities to enable the achievement of autonomous systems operations and functionality. This sensing scheme will sense, detect, perceive, and predict more practically and realistically as a human being would than is possible with standard sensors especially in adverse sensing and detecting conditions.

In another embodiment, it is an object of this invention to provide a sensor platform combining one or more sensing modalities to achieve several unique benefits. First, it constitutes a new sensing modality that is not possible with the standard sensors. Secondly, by combining the data streams of multiple sensing modalities, it will enable on-chip preprocessing of sensor fusion. Third, by incorporating sensor fusion, it will provide a facility for embedding meta-sensor information at the preprocessing stage to aggregate the information from the various sensor modalities observing the same scene in order to make it not only efficient to prepackage the data stream with intelligent markers, but also resolve conflicting information at the preprocessing stage. Finally, it will institute a machine learning framework for evaluating the meta-sensor information to make quick decisions and judgments in the same way that human beings make decisions after quickly aggregating various information sources.

Accordingly, it is an object of this invention to enable autonomous systems to gain the ability to capture, process, understand, and/or make quick actionable decisions, or combination thereof, based on multimodal contextual information that is invisible and otherwise unavailable to individual standard sensors. Accordingly, the invention will bring human intuition and perception to autonomous systems much in the same way that human beings perform. This invention monolithically and intelligently combines multiple sensing schemes into one with all sensor data preprocessed on-chip. It is then integrated with the intelligence to realize human behavioral prediction and a machine learning decision framework to produce a real-time 3-D mapping system that generates quick actionable decisions for proactive autonomous system responses to any situations during operations.

According to this invention, in the preferred embodiment, it is an object of this invention to achieve different sensing modalities, including, but not limited to, an imaging (2D or 1D), a 3D mapping, a 3D depth projection, a distance/range detection, detection and/or tracking an object (mobile or fixed), predictive/perception, or combination thereof capabilities.

According to this invention, It is an object of this invention to provide a sensor or meta-sensor (with or without its associated electronics), that can capture image, detect the object, project the object range, create the 3D cloud and/or mapping, tracking the object, and/or detect the apperception. The sensor or meta-sensor may be comprised of one-dimensional array or two-dimensional array of elements, or combination thereof, that have a capability of detection of the traveling time of a reflected radiation that is projected from a radiation source in close proximity from the sensor, detection of the reflected radiation (or transmitted radiation) from an object with or without a radiation source. It is an object of this invention to provide a radiation or multiple radiations from a radiation source or multiple radiation sources, which can create the radiation in ultraviolet spectrum, visible spectrum, near infrared (IR) spectrum, and/or above infrared spectrum beyond near IR spectrum, or combination thereof. In another embodiment, the meta-sensor comprise of various discrete sensors on the common platform whereby various discrete sensors are integrated either monolithically on a substrate or hybrid integrated on a carrier or carriers. The Meta Sensor may comprise several discrete devices or a single device that uses several different types of pixels to detect several different types of information. The Meta Sensor then conveys the fused data to an integrated circuit or processor that utilizes decision making software to make decisions based upon the type of autonomous system the sensor are part of.

In an another embodiment, it is an object of this invention to allow data to be sensed from multiple sensors such that if data cannot be detected in the data stream generated from one sensor, then another sensor can detect the relevant information and the data is fused and sent to the processor. The processor is able to look at all of the data and make a determination of how to operate based on the aggregated data in the fused data stream.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

For a better understanding of the aforementioned aspects of the invention and additional aspects and embodiments thereof, reference should be made to the Detailed Description, below, in which reference numerals refer to corresponding parts throughout the figures under Drawings. The invention will be explained in more detail in conjunction with the appended drawings wherein.

DETAILED DESCRIPTION OF THE EMBODIMENTS

Figures 1A, 1B:
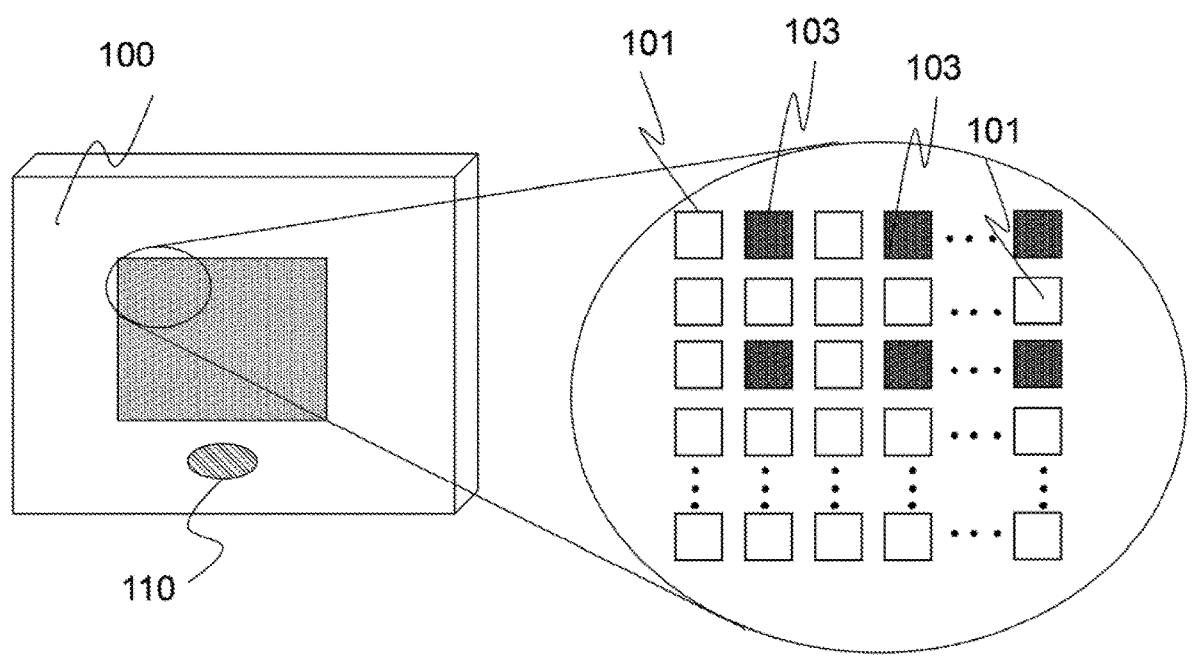
FIG. 1A is a schematic, showing a META sensor, or a Meta Sensor Stack, comprising imaging pixels, travelling time (TT) pixels, and an emitter, wherein the imaging pixels, TT pixels and emitter work together to act as a 1-D or 2-D image capture and arranged in 1-D or 2-D array for 2D scene image and 3-D object mapping, range finding sensor, and/or associated electronic devices, or combination thereof, in the preferred embodiment.
FIG. 1B is a schematic showing a magnified view of a meta sensor as shown in FIG. 1A according to this invention.

Reference is made in detail to the preferred embodiments of the invention. While the invention is described in conjunction with the preferred embodiments, the invention is not intended to be limited by these preferred embodiments. The contemplated embodiments for carrying out the present invention are described in turn with reference to the accompanying figures.

Reference numerals refer to corresponding parts labeled throughout the figures. The embodiments described herein pertain to a sensor device or system based on several devices located close proximity on a single carrier or multiple carriers, that capture images of scene, detects object and its range, creates 3D mapping of scene or the object, tracking and predicting a behavior, and/or making decision, or combination thereof, through optical, electrical, and mathematical techniques. The embodiments pertain to methods or techniques, and apparatuses for generating the decision in real time or close to real time for autonomous vehicle or robotic systems As used herein, the term "radiation source" associated with light radiation sources/emitter refer to a continuous or pulse light/radiation sources. Single or multiple light source units are housed under a panel. This is distinguishable from a mere collection or array of sources elements. An array is an arrangement of sources or detectors, but each source or detector is discretely placed, not connected to one another.

As used herein, the term "spectrum" associated with light or radiation refers to a radiation having specific wavelength and/or band of wavelengths, whether it is naturally available in the environment and/or artificially created using emitter or radiation source. The wavelength or band of wavelengths include, but not limited to, x-ray, ultra-violet (UV), visible, near infrared, infrareds (e.g. shortwave, midwave, longwave infrared), microwave, and radio-frequency.

As used herein, the term "meta sensor" associated with a sensor having multifunctional capabilities, wherein sensor elements possessing each specific function are housed under a common platform. Each functional element are arranged in side by side or close proximity to other functional element and the elements are a mere collection or array of elements. An array is an arrangement of elements of specific functional sensor, but each element for optical to electrical conversion is independently included in the array, and but the element connected to each optical to electronic conversion element and uses for electronic signal processing they are connected in array to signal processing. The meta sensor and its associated processing units putting together into a single module whether using monolithic or hybrid integration. Further meta sensor system includes meta sensor and its associated platform based on associated hardware located in close proximity and software.

As used herein, the term array of "MxN" associated with a meta sensor having multifunctional capabilities, wherein meta sensor of MxN array size comprise imaging sensor of array mxn (for example) and/or TT sensor of array of k×p elements. Alternatively, the array size for both imaging pixels array size could be the same array size. As used herein, the column and row number in first suffix indicate the meta sensor column and row and numbers, and to distinguish from imaging column or row with TT sensor column or row, second suffix k or p, and m or n are used for those corresponding row or column of the meta sensor for TT sensor and imaging sensor column or row, respectively.

As used herein, the term "travelling time" associated with a sensor to provide a specific function, refers to time taken to travel the emitted radiation to the object plus the reflected radiation back to the sensor. The sensor associated with traveling time provides a 3D mapping of the objects (in the scene) and/or depth of the image in real time As used herein, the term "electronic means" associated with a meta sensor or meta sensor system for processing a data or data stream to provide attributes, refers to chip or integrated circuit (IC) or functional device, including but not limited to electronic functional devices, electronics integrated circuit, optoelectronics integrated circuit, processor (e.g. a processor, multiple processor), digital signal processor (DSP), FPGA, microcontroller, and ADC (analog to digital converter).

As used herein, further the term "Autonomous" associated with a system to provide a specific function, refers to things that function separately or independently either partly or wholly without presence of human beings.

As used herein, the term "Autonomous system", refers to a system that function separately or independently either partly or wholly without presence of human beings, and further this system includes, robotic system, and autonomous vehicle (e.g. autonomous aerial. vehicle, autonomous ground vehicle, autonomous sea vehicle.

As used herein, the term "element or pixel" associated with a sensor refers to a single part, or smallest part of a sensor, arranged in a array (2D or 1D) to provide scene information in real time or close to the real time.

The terminology used in the descriptions of the embodiments herein is for the purpose of describing particular embodiments only and is not intended to limit the claims. The singular articles "a," "an" and "the" are intended to include the plural forms as well, unless the context clearly indicates otherwise. It will also be understood that the term "and/or" refers to and encompasses any and all possible combinations of one or more of the associated listed terms. Similarly, the conjunction "or" is not necessarily mutually exclusive.

References will now be made in detail to embodiments, accompanied by numerals that correspond to appropriate parts of the figures. Examples will be provided to illustrate the various ways the present invention may be utilized. Specific details will be set forth to provide a thorough understanding of the present invention. However, it will be apparent to those with ordinary skill in the art that the present embodiments may be practiced without these specific details. In other instances, known methods, procedures and components have not been described in detail to avoid unnecessarily obscuring aspects of the embodiments.

According to this present invention it is our objective to provide an innovative sensor and associated sensing scheme for autonomous systems. The invention is a novel hardware-based sensor with natively implemented sensor processing and machine learning capabilities to enable the achievement of autonomous systems operations and functionality. This sensor and sensing scheme will sense, detect, track, perceive, and predict more practically and realistically as a human (e.g. "like human") being which is not possible with standard sensor, in all conditions (e.g. climate, moving) including adverse sensing and detecting conditions for taking the decision to act.

Human beings experience their environment through various biological senses. Human beings have the ability to experience their environment by utilizing their five biological sensors, which make up their physiology. These five senses include Sight, Taste, Sound, Smell, and Touch. Each of the five senses are enabled by a separate physiological organ, some herein not shown, which are the eyes, the tongue, the ears, the nose, and the skin, which can feel all over the body experiencing temperature or various stimuli when in contact, but most simply manifested by the human's ability to touch and feel with their hands. The five human senses perform specific individual functions depending on the stimulus or environment the human experiences; for example, when we see a person in front of us, taste when we eat food, hear music playing or conversation, smell smoke, or feel hot or cold depending on the season as representative stimuli. For normal human beings, the five senses are constantly engaged and actively sending signals to the brain, which interprets the stimulus and tells us what we are experiencing. The five senses are engaged simultaneously and with the brain aggregating and processing all the information, humans are able to function within their environments acting and reacting to stimuli seamlessly. For certain environments, one or more of the five sensors are most active, with those not needed are not engaged for the stimuli at hand. The processing of stimuli from the five senses happens in real-time with the brain providing processing, interrelations, and making decisions also in real-time.

Although the processing of the five senses is nearly instantaneous, there is a logical sequence that is involved in the process. Vision or eyesight, which is the ability to see, is perhaps the most obvious and important of the five senses, which can be illustrative of the process involved between any of the five senses, the physiological organ involved, and the interpretations and decisions that result from the brain. When a human being sees something within its field of vision, the following steps occur in the process of the sense of sight. First, the eye will see the object by detecting the light reflected by the object that fall on the eye and sense that there is something there; this is the ability to distinguish an object from the background in which it has been sighted. This step is referred to as Detection and Sensing. At this point the eye and the brain are working together with signals firing and transmitting between the eyes and neurons in the brain. The next step is the ability for the brain to recognize the object seen and to classify it as something in a general way as to what is being seen, for example, whether it is an animal, another human, a vehicle, and so on. This step is referred to as Recognition and Classification. The next step is the ability for the brain to describe the object in details, for example, if an animal, it is a dear or cow, or horse, if a human is a man with a hat, a vehicle that is a Mercedes etc. The details also include dimension such as quantity, size, weight, and distance from the human and so on. This step is referred to as Identification and Dimension. The next step is the ability for the brain to describe the behavior or state of the object observed. For example, if it is a person, are they walking, running, laughing, etc. or if it's a automotive, is it stationary, moving away etc. This step is referred to as Behavior and State.

The next step is the ability for the brain to weigh all the information processed in the previous steps to assess the situation based on the observation so far. This step involves evaluation of what has been seen, recognized, identified, and behavior contextualized. This assessment leads to the brain making a judgment based on what is observed and a decision is made. The context informs the decision on what is happening and what is about to happen in the situation. This stem is referred to as Decision and Judgment. The next step is the ability for the brain to engage additional information from other senses that may have input into the situation as well as historical knowledge, context, and known behavior from the same or similar situations. For example, if a car is approaching, are they going to stop or continue, are they in their lane, are they likely to hit the observant, is it an emergency situation, is it part or normal behavior etc. The brain engages all available additional information and the continuously changing behavior or state of the observed object to determine the appropriate cause of action to respond to the situation at hand. This is a highly complex cognitive function in the brain that happens in almost immeasurably short time. This step is referred to as Intuition and Perception. Finally, with the aggregation of all the previous steps, the brain invokes an action or reaction, which could be to do nothing, or move out of the way of a car, or run for one's life if there is danger, or any number of responsive actions or reactions appropriate to the situation at hand.

In this manner, one of the five senses, in this case sight, has initiated the sequence of steps Detection and Sensing, Recognition, and Classification, Recognition and Dimension, Behavior and State, Decision and Judgment, Intuition and Perception, to induce the appropriate Action and Reaction. Vision is the most obvious and illustrative sense of the five senses; however, these general steps have relevance in each of the other four senses for example taste when one eats, sound when one hears, aroma when one smells, and feel when one touches. In some cases, not all steps are required, and in repeated stimuli, some steps are unnecessary when in integration. For example, in real-time, once a car has been identified as approaching, it is only necessary to update its changing behavior and state relative to the person observing it in order to maintain an already invoked action or reaction or to modify that action or reaction as deemed necessary.

In the same way as a human being is capable of exercising its five senses, according to this invention, meta sensor along with its associated platform (herein after combinedly mentioned as "meta sensor") possesses several functionality (e.g. a scene image, depth, 3D mapping, behavior), and this meta sensor comprises several functionals sensors in combination with additional electronics means and software components including, but not limited to integrated circuits, memory, processor, database, artificial intelligence, machine learning, and data processing explained in more details in FIGS. 1A-7, is capable of emulating the five senses of the human being by implementing the steps involved in the process. The meta sensor and its associated platform invention follows the steps necessary to achieve the five human senses. First, the sensor detects and senses the presence of an object in the Detection and Sensing step. This attribute is designated as the sensor platform's ability to "See". Next, the meta sensor recognizes and classifies what it has detected according to the Recognition and Classification step. This attribute is designated as the sensor platform's ability to "Taste". Following that, the meta sensor identifies and dimensions the objects identified according to the Identification and Dimension step. This attribute is designated as the sensor platform's ability to "Hear". Next, the meta sensor determines the state and behavior of the observed object according to the Behavior and State step. This attribute is designated as the sensor platform's ability to "Smell". Following that, the meta sensor makes a judgment about what is happening and what might happen and makes a decision according to the Decision and Judgment step. This attribute is designated as the sensor platform's ability to "Touch". Thereafter, the meta sensor evaluates all available information up to that point including any updates from the previous steps within the context of the situation according to the Intuition and Perception step. Finally, the meta sensor invokes an Action or Reaction directed to an autonomous system such as a car or similar system to which the meta sensor would be attached. In this manner in which a human being experiences their environment with the five senses, the meta sensor will achieve the five human-like senses according to this invention. Based on a software module incorporated in to the meta sensor and/or meta sensor system, various ways can be adopted to obtain the five sense (human like) and could take the decision.

FIG. 1A and FIG. 1B are schematics showing a meta sensor and its magnified view to show main idea, in the preferred embodiment, according to this invention. The meta sensor or meta sensor stack 100 comprises of a array of elements or pixels possessing different functionalities. The pixels or elements possessing different functionality are arranged close to each other, or side by side, or close proximity to another functional pixel. In way of an example not way of limitation, imaging sensor pixels 101 that sensitive to a radiation or a specific-band of radiation and possess information to provide a scene image or video image of the scene. The traveling time sensor pixel 103 that are sensitive to the same radiation or the same specific band of radiation or a different radiation than that of image sensor pixel, or a band of radiation different from that of image pixel, and detects light (or radiation) reflected light back from an object, either located in close proximity or in a distant object. The image sensor pixel 101 and the travelling time sensor pixel 103 are arranged in array, wherein the sensor of different functionalities are together for signal processing (not shown here) or independently connected to provide each function separately after putting together, the meta sensor for example is able to produce 2-Dimensional images or video in motion, and also to determine the distance between the objects and the sensor, and 3-D mapping of the objects in the scene. In way of an example not way of limitation, the arrangement of the image pixels 101 in the meta sensor compared to the travelling time Pixels 103 is located in a next neighbor configuration, wherein the travelling time Pixels 103 are located such that they are surrounded by image pixels. Again, in way of an example not way of limitation, the image pixels 101 is arranged in every other row and also in every other column of the meta sensor, leaving the space to be filled by TT pixel, as shown in FIG. 1. The radiation mentioned herewith is the radiation naturally available and/or generated by using of a radiation source or emitter 110, which can be integrated to the meta sensor monolithically or hybridly integrated to the meta sensor located in close proximity to the meta sensor. The radiation source 110 generates the radiation either the visible or other band of spectrum (in wavelengths) to project/scanned to objects. The detailed of this meta sensor is described from FIGS. 2A to 2E.

The data from the pixels of a meta sensor as shown in FIGS. 1A and 1B, provide the information of several different sensors, including but not limited to 2-D scene images, object range, 3-D image depth, 3-D mapping of the objects/or scene in various radiation spectrum including but not limited to, ultraviolet (UV), visible spectrum, infrared (IR) Visible, infrared, or combination thereof. The meta sensor, its associated electronic means and platform provides preprocessed data-set information or processed data-sent information, or decision information to control system (not shown here). In the case of preprocessed information which is to be sent to the system for machine learned model to provide the decision to send to the control system of a autonomous system.

In way of an example not way of limitation, as briefly mentioned in FIGS. 1A and 1B, the Meta sensor 100 also includes an illuminator or emitter 110 that emits a radiation, that scanned or projected to a scene. The radiation reflected from an object is detected by the TT 103 sensors and is used to determine the distance of objects from the sensor, 3-D mapping, depth of a scene image or depth of a video image. The emitter 110 may emit radiation continuously, or at fixed time intervals. Emitting light at fixed intervals, similar to flashed on a camera allows for the three-dimensional imaging, when coupled with the TT pixels 103. Alternatively, the TT pixels 103 may work with the emitter 110 when the emitter is emitting light continuously.

Alternatively, in an another embodiment, the Meta sensor 100 may comprise of several separate meta sensors those are housed in the same housing or separately in a different housing, different from or the same as that of shown in FIGS. 1A and 1B. The meta sensors may be arranged in close proximity or separated by some distance, depending on the condition the meta sensors are to be used. The distributed Meta sensors with several spread out sensors may then capture three dimensional images, 3D mapping, object distance, image depth, or a combination of thereof, by combining images from several two dimensional image sensors, rather than rely on the TT sensor and the emitter, or in combination with TT sensors.

Further, alternatively, those meta sensors may include, but not limited to, one or more emitters 110, one or more separate TT sensors 103, one or more separate image sensors 101 according to this invention. Alternatively, in the preferred embodiment, more than one emitters 110 (not shown here) may illuminate a same wavelength or a same band of wavelengths of light, or a different wavelength or a different band of wavelength, or a combination thereof. Further, alternatively, the different meta sensors, as mentioned earlier, may sense the same wavelength or the same band of wavelength, the different wavelength or the different band of wavelength, or a combination of thereof. Alternatively, in the preferred embodiment, each meta sensor may sense or detect the different wavelength or the different wavelength band, and/or fused the different meta sensor information to get fused data stream.

Alternatively, in an another embodiment the embodiment the image pixel 101 and TT pixel 103 may be arranged in alternating fashion, wherein each pixel in each row alternates between a image pixel 101 and TT pixel. This creates a checkerboard like effect. The alt ernating rows may be aligned creating columns of image pixels 101 and TT pixels, wherein each column consists of one type of pixel and each column alternates, or the rows may alternate, wherein each row is continuously one type of pixel and the rows alternate between the two. Additional alternative embodiments allow for the image pixels 101 and the TT pixels to be clustered in groups of more than one row and column in size. The groups of image pixels and TT pixels may be arranged in the same manner as the individual pixels are as described.

Alternative embodiments may also include image pixels 101 and TT pixels 103 that detect different wavelengths, or bands of wavelengths. There are many possible configurations. The nearest neighboring image pixels 101 may have a different wavelengths or bands, while there is only one TT pixel type. Alternatively each TT pixel 103 may detect different wavelengths or bands than its nearest neighboring TT pixel 103. Furthermore both the image pixel 101 and TT pixel 103 may have neighboring pixels of the same or different type vary from there neighbor. Additionally grouping of image pixels 101 or TT pixels 103 may comprise several different image pixels 101 and TT pixels 103 respectfully. Additionally groups of different image pixels 101 may be arranged relative to TT pixels 103 as individual pixels are arranged in the above discussion.

Furthermore, the individual pixels may be located on an individual substrate, or hybridly put on a common substrate. Additionally groupings of pixels of common type may be located on there own substrate, and the grouping are located in close proximity to each other. Alternatively the image sensor pixels of single or multiple wavelengths or bands may be located on a single substrate, along side TT pixels of single or multiple wavelengths or bands.

Figure 2A:
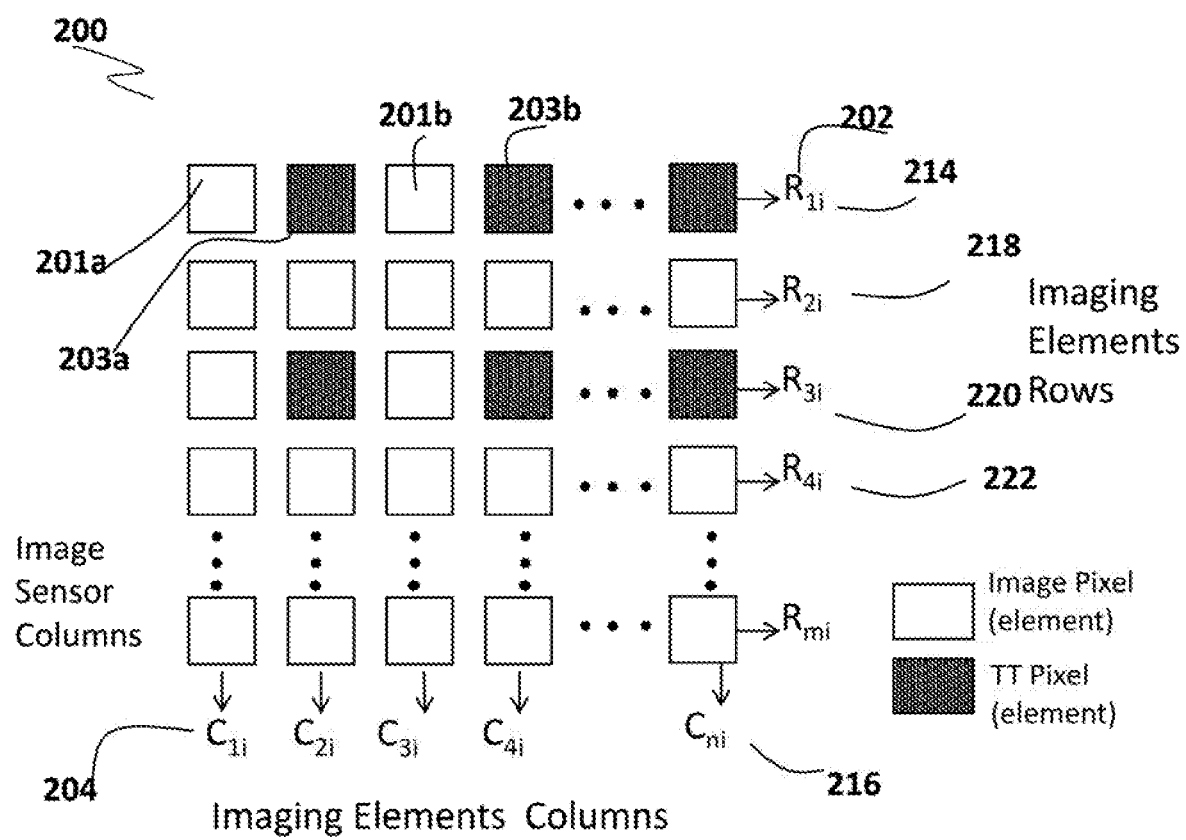
FIG. 2A is a schematic showing an meta sensor in an embodiment which is comprised of 2-D Image Sensor in combination with a time of traveling time (TT), whereby the image sensor can be sensitive to various spectrums of light including ultraviolet, visible, and infrared light, and further the image sensor and TT is a monolithic integrated circuit chip.

FIG. 2A is a schematic, showing magnified magnified view of main portion of meta sensor in the preferred embodiment, according to this invention, wherein like numerals represent the like parts as shown in FIGS. 1A and 1B, so that repeated explanation n is omitted here. In way of an example not way of limitation, the meta sensor 200 comprise of more than one imaging pixels forming a single image sensor or multiple image sensor, which is in combination with more than one travelling time pixels forming travelling time sensor, whereby the single image sensor or multiple image sensors are sensitive to a single wavelength or band of wavelengths, various spectrums of light including ultraviolet, visible and/or infrared light, and further the image sensor and TT sensor are monolithically integrated on the same chip. In a meta sensor, the 2D pixel array comprise of an array of any number of rows "M" of pixels 202 and columns "N" of pixels 204 to make an "M× N" array of pixels, wherein the 2D pixel array comprise of an array of any number of rows "M" of pixels 202 and columns "N" of pixels 204 to make an "M×N" array of pixels, and wherein an array of "m×n" pixels are arranged/allocated for imaging pixels and "k×p" pixels or elements (not shown here) for TT sensor. In FIG. 2A, the meta sensor 200 e is one example of an M×N array, for illustration and description only, but that meta sensor can be of any array size. The first pixel of the first row and first column of the sensor array is an imaging type of pixel at the location (R1i, C1i) 201a. The second pixel of the first row and the second column of the sensor array is a TT type of pixel at the location (R1i, C2i) 203a. Similarly, the third pixel of the first row and the third column of the sensor array is an imaging type of pixel at location (R1i, C3i) 201b. Similarly, the fourth pixel of the first row and the second column of the sensor array is a TT type of pixel at the location (R1i, C4i) 203b. Thereafter, the sensor array pixel type alternate between an imaging type pixel and a TT type pixels for the rest of the columns in the first row 214 up to column n 216. The entire second row (R2i) 218 of the sensor array across all columns up to column N216 consists of imaging type pixels. The third row (R3i) 220 of the sensor array will repeat the same pixel configuration and pattern as describe for the first row (R1i) 214 and the description will not be repeated here. In fact, all the odd numbered rows will be identical to the first row (R1i) 214. The entire fourth row (R4i) 222 of the sensor array across all columns up to column N 216 consists of imaging type pixel and is identical to the second row (R2i) 218. In fact, all the even numbered rows will be identical to the second row (R2i) 218. The configuration and pattern of the pixel could be of various combinations including, but not limited to alternating between imaging pixels and TT pixels for every other location, every other row, every two locations, every two rows, and so on including entire rows and columns of one type or the other type of imaging and TT pixels. Alternatively, the imaging pixel 201 and TT pixel array may be located in separate location as their own formats (not shown here), but not putting together side by side of each type of pixel, as shown in FIG. 2A.

The imaging type of pixel 201 (e.g. 201a, 201b) comprises of various types of pixel circuits including, but not limited to the following. The pixel circuits can be a Capacitance Trans-Impedance Amplifier CTIA), Source Follower (SF), Direct Injection (DI), Buffered Direct Injection, or a combination thereof. The pixel can be comprised with complimentary double sampling (CDS) for noise reduction. Each pixel can be further comprised with either a analog signal processing unit and/or digital signal processing unit (e.g. analog-to-digital converter) in the pixel.

Figure 2B:
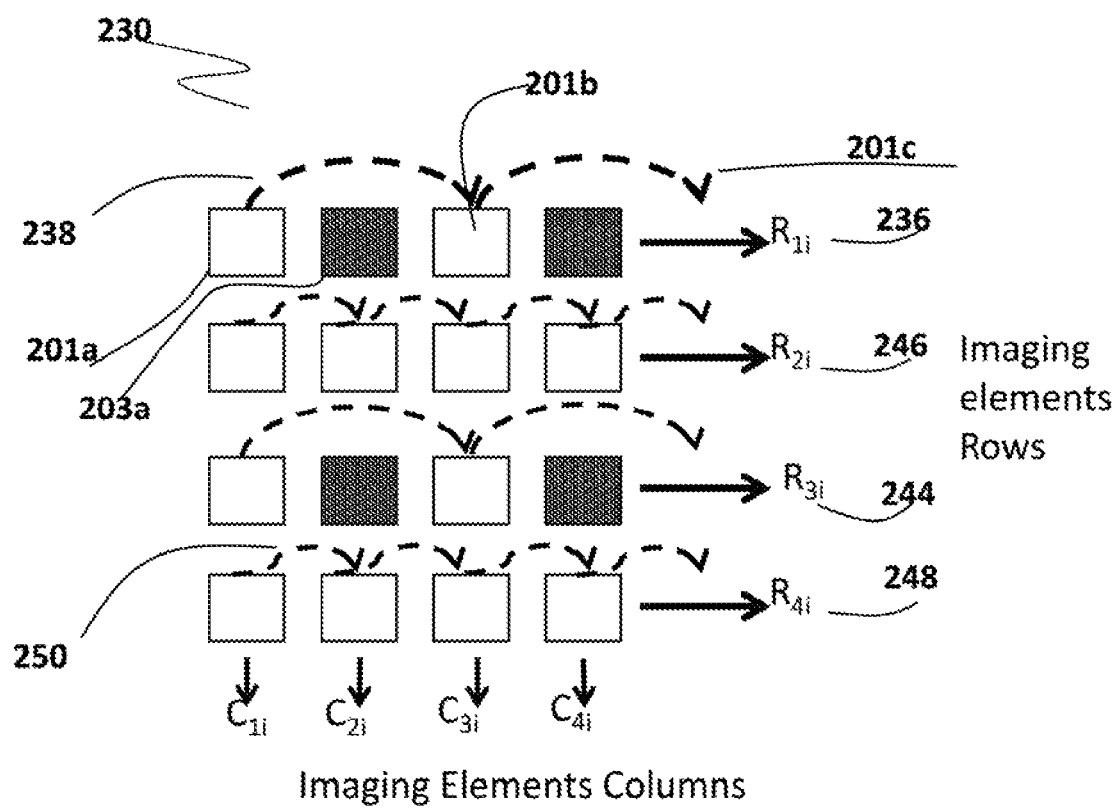
FIG. 2B is a schematic showing an meta sensor of M×N pixels in 2-D array and its processing, wherein m×n pixels arrays for imaging elements in the preferred embodiment, wherein the data is parallelly transferred to the right and/or left for depth projection and bottom and/or top for image capture as for example according to this invention.

FIG. 2B is a schematic, showing a information processing in an image sensor array in a meta sensor, as an example, in meta sensor in the preferred embodiment, according to this invention, wherein like numerals represent the like parts as shown in FIGS. 1A to 2A, so that repeated explanation is omitted here. An image sensor processing of 230 (in a meta sensor) is shown in FIG. 2 for example only. The processing unit wherein the information process 230 for imaging pixels in meta sensor is done, comprises of a 2D imaging sensor and it associated electronics means to get 2D image information from the meta sensor of having M rows×N columns of pixel of 200, as described in detail in FIG. 2A. In way of an example not way of limitation, for processing of a image (in a scene), only the imaging type pixels 201 of the M×N meta sensor array are processed and the TT type pixels 203 are not processed for image purpose. For processing image signal processing from pixel to pixel located in a row and a column, the data from one-pixel to move to another pixel located in the row, and transferred to the column for those pixels located also at that column, and thereby, the pixel for a image processing are connected accordingly. As for example, the first row 236 (in FIG. 2B), data is transferred from the left most pixel to right most pixel possessing imaging and the left-most pixel is connected to transferred to the left 238 across the row R1i 236 from the first pixel at location (R1i, C1i) 201a to the third pixel at location (R1i, C3i) 201b and skipping over the TT pixel at location (R1i, C2i) 203a. In this manner all the even-numbered columns of the first row 236, which comprise of TT pixels are skipped, while data from the odd-numbered column image pixels are shifted to the next odd-numbered image pixel location 201c until all the pixel image data has been shifted out of the first row 236. The same procedure is used to process the image sensor pixel data for each odd-numbered row of the array 244 and so on. For the second row 246 and all even numbered rows 248 and so on of the image sensor array, there are no TT type pixels, and therefore image sensor pixel data is shifted from the right most successively 250 for each column until all the pixel image data has been shifted out of the second column 246 to the right-most pixel and shifted to the column, and similarly for all even-numbered rows of the array. The column get all data from the image pixel located at the column and shifted data from one row to the next row (not shown here), just like standard image sensor.

Figure 2C:
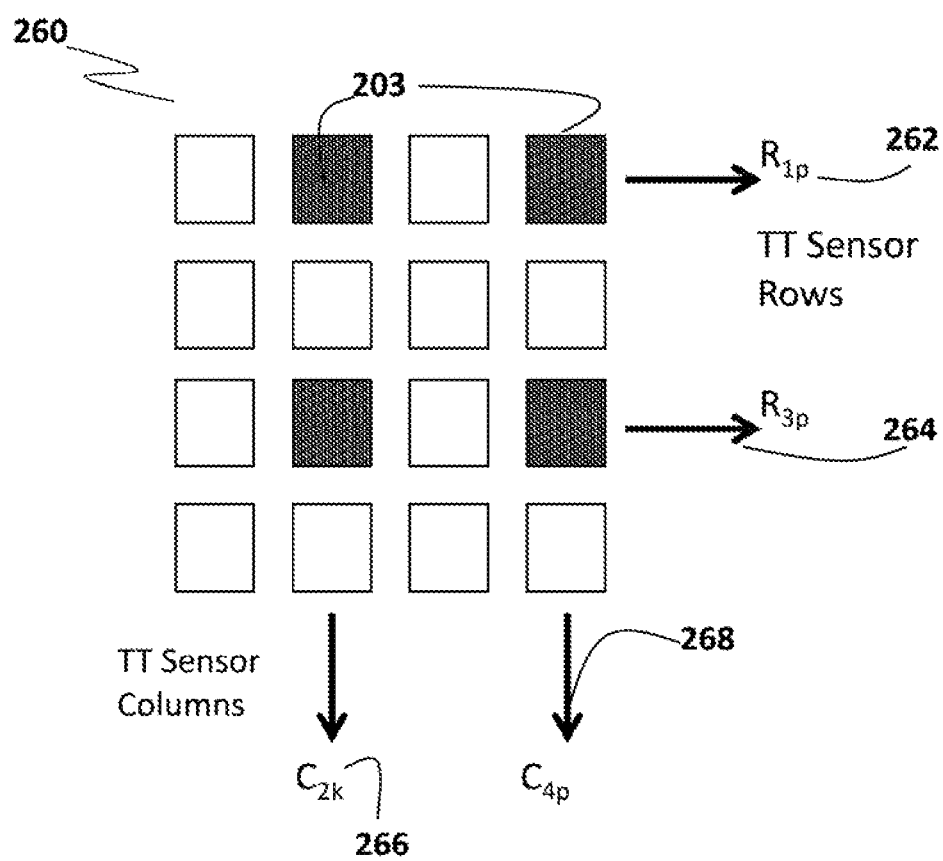
FIG. 2C is a schematic showing an meta sensor of M×N pixels in 2-D array wherein k×p pixels arrays for time of arrival pixels in the preferred embodiment, where the data is parallelly transferred to the right and/or left for depth projection and bottom and/or top for image capture as for example according to this invention.

FIG. 2C is a schematic, showing a part of a TT sensor array in a meta sensor array, as an example, in the preferred embodiment, according to this invention, wherein like numerals represent the like parts as shown in FIGS. 1A to 2B, so that repeated explanation is omitted here. A portion of TT sensor array 260 is shown in FIG. 2C, and comprise of a array of k×p pixels in meta sensor of array of M×N pixels of 200 (as explained in FIG. 2A) which is also includes the 2D image sensor array pixels and The TT sensor array comprise of TT TT pixels in row 1 (in meta sensor), R1p (mentioned as for TT sensor row) 262, row 3 (in meta sensor), R3*p* (mentioned for TT sensor row) 264, and similarly all odd-numbered rows of an array of any number of rows m of pixels and columns n of pixels to make an m×n array of pixels as described in detail in FIG. 2A and not repeated here. The TT sensor array is comprised of TT pixels in column 2 (in meta sensor), C2*k* (mentioned for TT sensor column) 266, column 4 (in meta sensor), C4 (mentioned for TT sensor) 268, and similarly all even-numbered columns of an array of any number of rows M of pixels and columns N of pixels to make an meta sensor of M×N array of pixels, wherein as for example, m×n array of pixels for imaging sensor pixels, and k×p array of pixels for TT sensor pixels.

Figure 2D:
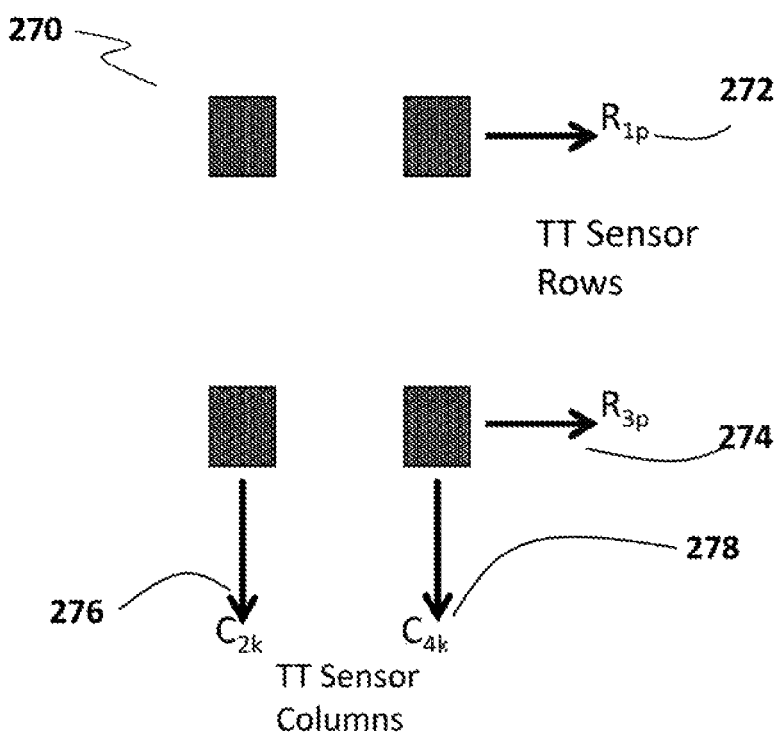
FIG. 2D is a schematic, illustrating a k×p arrays of TT sensor from M×N meta sensor arrays, as shown in FIG. 2B and FIG. 2C, in the preferred embodiment.

FIG. 2D is a schematic, showing a part of a TT sensor array in a meta sensor array, as an example, in the alternative preferred embodiment, according to this invention, wherein like numerals represent the like parts as shown in FIGS. 1A to 2C, so that repeated explanation is omitted here. In FIG. 2D, the TT sensor array 270 in meta sensor comprise of 2D a travelling time sensor, same as that of TT sensor array 260 already explained in FIG. 2C, therefore repeated explanation is omitted here. The TT sensor array comprises all of TT pixels in all the odd-numbered rows 272, 274, and so on and all the even-numbered columns 676, 678, and so on, of an array of any number of rows M of pixels and columns N of pixels to make an M×N array of pixels of meta sensor, which comprises of TT sensor of array of k×p pixels, and m×n array of pixels for imaging pixel. In way of an example not way of limitation, the TT sensor array 270 in meta sensor is of a k×p array where k=4 and p=4 to make a 4×4 TT sensor like TT sensor 260, as explained in FIG. 2C. Based on the arrangement of TT sensor and image sensor array, any array size of TT sensor array and also imaging sensor array could be possible. Alternatively, the TT pixel can be arranged in meta sensor for every other two image pixel, or the TT pixel arrays can be arranged in one of the side of meta sensor and other side image pixel are located. Alternatively, the signal for both processed and can be taken out from the same column or separate column. Various combination of arrangement of TT pixel and image pixel array can be made in met sensor. An example is explained here.

Figure 2E:
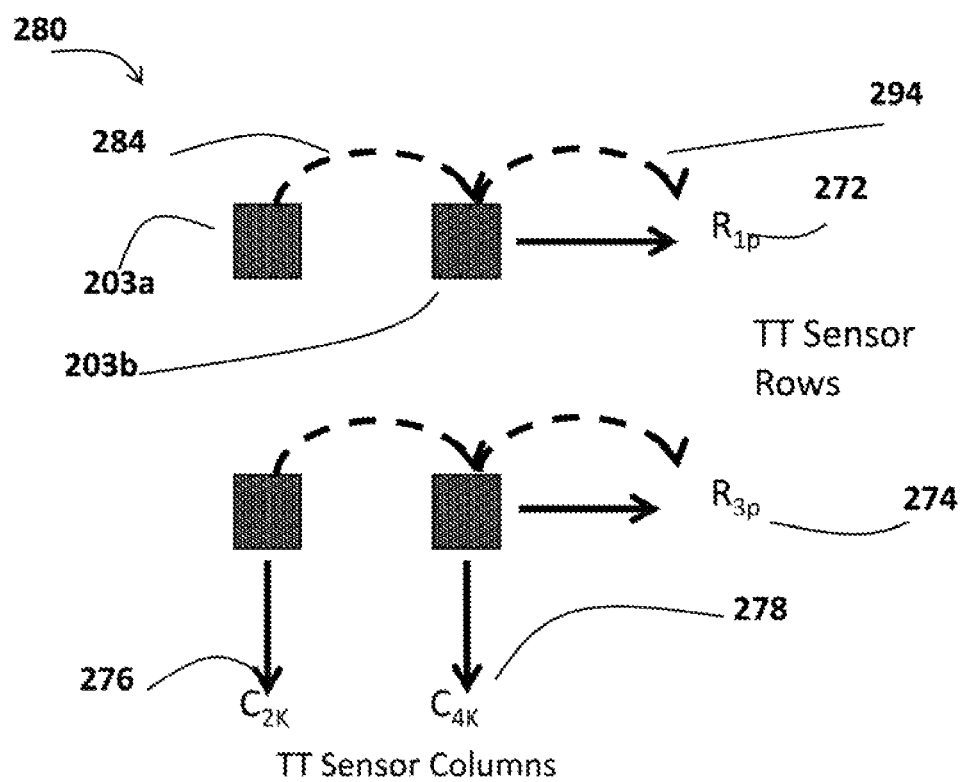
FIG. 2E is a schematic, illustrating processing of a k×p arrays of TT sensor from M×N meta sensor arrays, as shown in FIG. 2B and FIG. 2C, in the preferred embodiment.

FIG. 2E is an illustration, showing a part of a TT sensor array and its signal processing scheme, as an example, in the alternative preferred embodiment, according to this invention, wherein like numerals represent the like parts as shown in FIGS. 1A to 2D, so that repeated explanation is omitted here. In FIG. 2E, TT sensor array signal processing scheme 270 is shown, and it comprises of processing scheme 270 in 2D TT sensor array where there are k rows×p columns of pixel, that k×p array of pixels for TT sensor array is originated from an arrangement TT sensor and imaging sensor that possess the array of M×N, as explained earlier. For signal processing of the TT sensor array, only the TT type pixels of k×p array pixels, in the M×N meta sensor array are processed and the image sensor pixels are not processed and not shown. For the first row R1*p* 272, data is transferred to/from the left 284 across the row R1*p* from the second pixel at location (R1*p*, C2*k*) 203*a* to the fourth pixel at location (R1*p*, C4*k*) 203*b* and skipping over the imaging pixel (not shown here). In this manner all the odd-numbered columns of the first row R1*p* 272, (skipping imaging pixel in between which not shown here), while data from the even-numbered column pixels 276, 278 and so on are shifted to the next even-numbered pixel location 294 until all the TT pixel data has been shifted out of the first row 272. The same procedure is used to process the image sensor pixel data for each odd-numbered row R3*p* 274 and so on of the array. The second and all even numbered rows of the sensor array, not shown, are skipped or ignored since they are image sensor pixels and not processed as part of the TT sensor array 270. In way of an example not way of limitation, any way of connecting the TT sensor in row and column for example, technique of signal processing can be done or used for TT sensor array (not shown here all) to extract the 3D mapping information, distance of the object to the sensor, and/or also depth of images, or a combination thereof from the optical to electrical signal converters (e.g. photodetector) arranged in an array.

Figure 3:
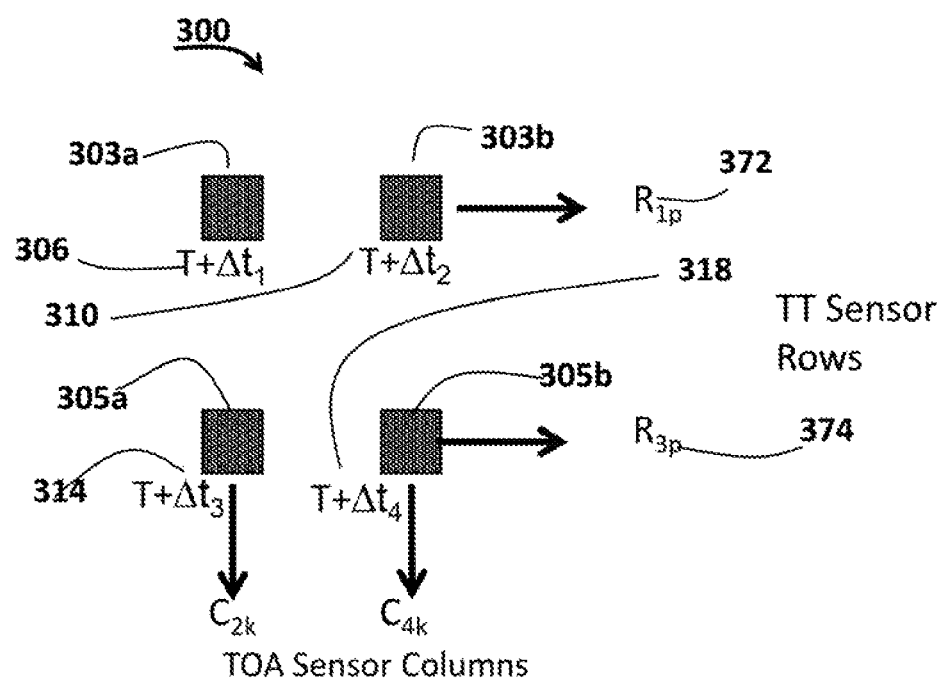
FIG. 3 is a schematic, showing processing of 2×2 (as an example) TT pixels or elements taken from M×N meta sensor arrays, as shown in FIG. 2B and FIG. 2C, in the preferred embodiment, wherein each TT element getting reflected radiation after emitting radiation to generate a 3D geometric pattern, and/or measure the distance to a detected object, and also provide a depth map of an image in combination with the imaging pixels according to the Meta-Sensor invention.

FIG. 3 is an illustration, showing a principle behind of which a TT sensor produces a 3D mapping, distance and/or image depth, as an example, in the preferred embodiment, according to this invention, wherein like numerals represent the like parts as shown in FIGS. 2A to 2E, so that repeated explanation is omitted here. Signal processing 300 of a detector array in TT sensor comprises a 2D array (e.g. k×p) TT processing scheme for processing a timing information gathered by each pixel of TT sensor of array size k×p and produces a 3D attributed (e.g. depth, mapping). For convenience of understanding and explaining, the TT sensor (in met-sensor) is considered to explain and avoided imaging sensor pixel. Each pixel in TT sensor (forming a part of meta sensor) measure the travelling time, wherein travelling time is the time taken for the radiation (rays) coming out from emitter/illuminator, located close proximity to TT sensor, and travelling to a point on an object, and coming back to the TT sensor after reflection from the point of the object. The radiation rays, reflected from the object in spatially are made to incident to a meta sensor wherein each pixel of a TT sensor gets various travelling time information of the radiation rays, from which the 3D depth/mapping information, range information can be obtained. A separate apparatus that could be a part of meta sensor platform or meta sensor, or completely independently operated apart from the meta sensor is used to generate and emit calibrated rapid light emissions. In way of an example not way of limitation, the reflected light rays are detected by the TT detector array at various time intervals as follows. For the first row R1*p* 372, the first TT pixel at location (R1*p*, C2*k*) 303*a* 74 will detect/sense a light emitted at a time of T (not shown here) and received by the TT pixel at time T+Δ$t_1$ 306. The second TT pixel at location (R1*p*, C4*k*) 303*b* will detect or a light reflected from a object at time T+Δ$t_2$ 310. The third TT pixel at location (R3*p*, C2*k*) 305*a* will detect a light reflected from the object at time of T+Δ$t_3$ 314, and the fourth TT pixel at location (R3*p*, C4*k*) 305*b* will detect a light reflected from the object at time T+Δ$t_4$ 318. For convenience of explanation, different time interval has been mentioned, however, based on the object 3D dimension, the time interval (travelling time) after radiation, emitted from emitter and after reflection may not be exist for some pixel. Similarly, for any TT pixel in the TT array of size k×p, at any location (Rk, Cp) will detect/sense a light radiated from the objects at time Tp+Δ$t_p$, Tp, where Tp is the time at which light is emitted from the emitter In this manner, the TA sensor array is capable of generating a 3D pattern image, as well as measure the distance to a detected object, and also provide a depth map of an image in combination with the image sensor according to this invention in the preferred embodiment.

Figure 4:
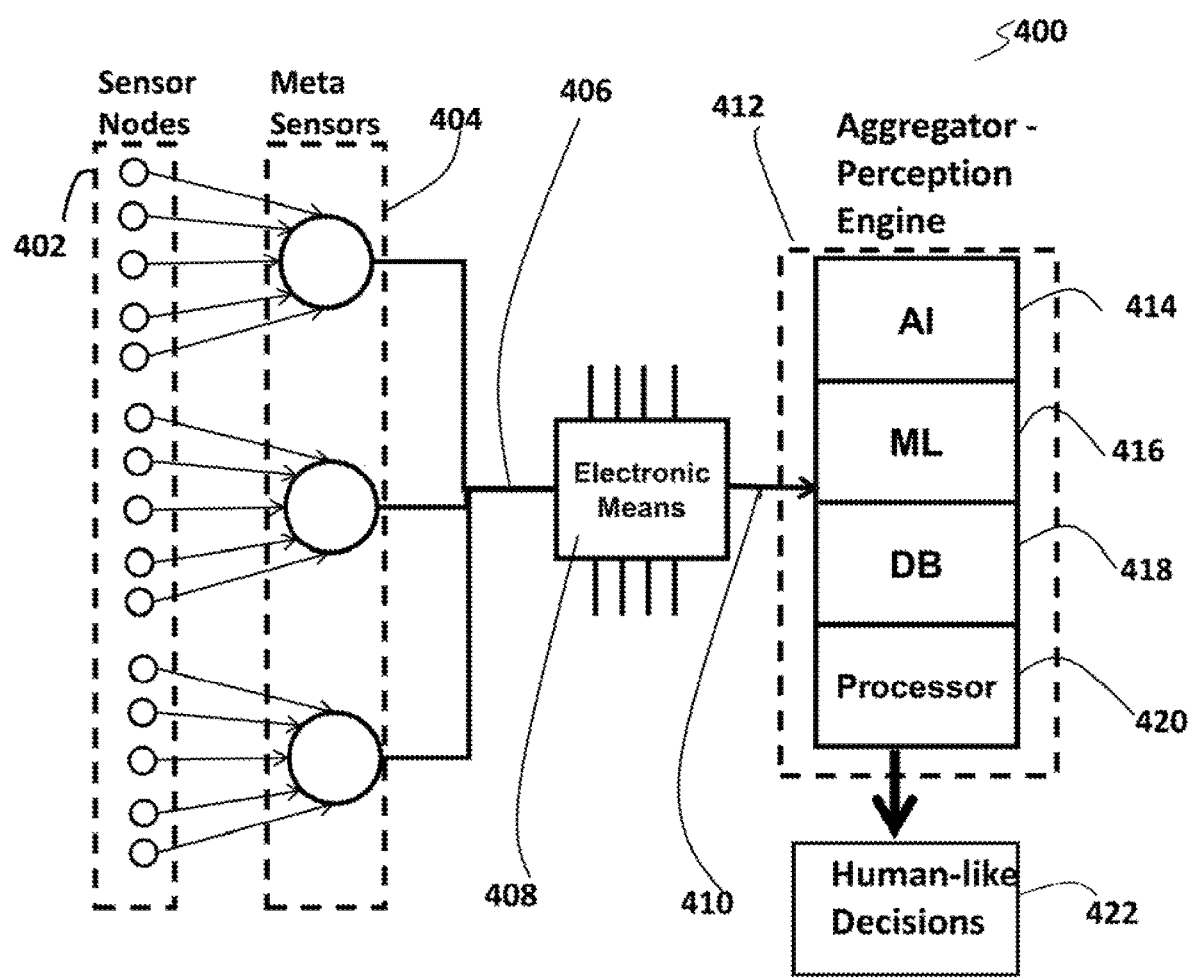
FIG. 4 is a schematic showing an alternative embodiment of a meta sensor system with more than one sensor nodes wherein each sensor node comprise of a single sensor providing similar or different modal sensing and Meta Sensor fuses the data coming from each node prior to sending the data onward to the processor, and the Aggregator Perception Engine makes human like decisions.

FIG. 4 is a schematic showing a meta sensor platform in the preferred embodiment according to this invention. In way of an example not way of limitation, the meta sensor platform 400 has a single or a multiple sensor nodes 402 whether they are the same or different kinds and forming a single or multiple meta sensors 404. The data coming out from a meta sensor 404 forming the data streams 406 which feed to the electronics means 408. The data streams can be feed to the electronic means 408, in parallel or in serial. Data coming out from different meta sensor or a single meta sensor based on several sensors, can be made to input to electronic means in parallel, which helps to process the data in faster speed and specially based on the electronic means processing time. The data from different meta sensors or a single meta sensor based on more than one sensor data can also be alternatively feed to the electronic means 408 in serially to process the data or data stream. The data or data stream 410 processed in 408 send to an Aggregator Perception Engine 412. The data or data stream 410 from electronic means 408 may have a single data or data stream output or multiple data/data stream outputs (not shown here). The Aggregator Perception Engine 412 comprise of an artificial intelligence (AI) algorithms module 414 with or without having AI model, a machine learning (ML) module 416 with or without having trained model, a data-base 418, software module (not shown here), or a combination of thereof. In way of an example not way of limitation, the aggregator perception engine 416 can be included into a separate electronic means, different from the electronic module 408, or alternatively included into the same electronic means 408 (not shown here). The separate electronic means or the same electronic means 408 may include but not limited to a memory, a processing unit (e.g. processor) 420, which can make a human-like decision 422 to send the information to the control unit (not shown here). In way of an example not way of limitation, the electronic means 408 can me included into the meta sensor (not shown here), or separate module. Alternatively, the electronic modules comprise of a preprocessing unit and also an aggregator perception engine, and this electronic means can be included into the meta sensor or separate module (not shown here).

Figure 5A:
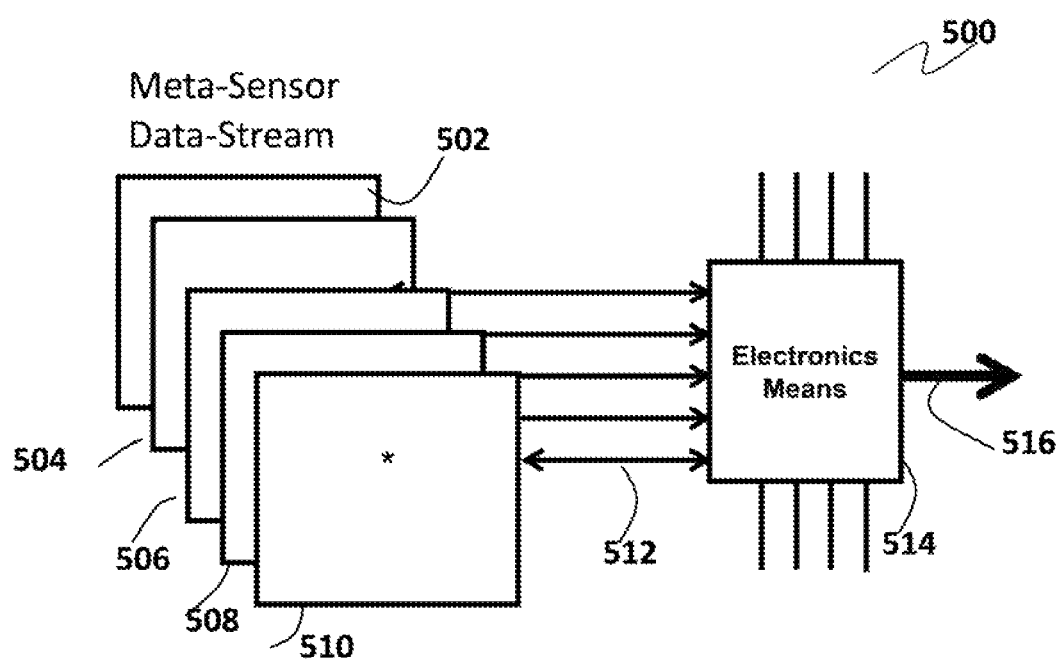
FIG. 5A is a schematic showing Post-processed Sensor data-stream in the preferred embodiment, wherein each of multiple sensors generates their own separate data streams and each independent data stream is sent to the electronics means (e.g. a central processing unit (CPU)) or general processing, where the output is then used to make decisions on some actions, or specific action.

FIG. 5A is a schematic showing a processing data after a single meta sensor or a multiple meta sensor in the preferred embodiment according to this invention. In way of an example not way of limitation, in meta sensor platform 500, the data stream from each sensor (e.g. a imaging sensor, radar, a ranging sensor) included into to the single meta sensor or the multiple meta sensors generates each data streams of 502, 504, 506, 508, and 510. Each data stream 512 can be sent independently or parallelly to an electronic means (e.g. a processor, a microcontroller 514. In way of an example not way of limitation, the preprocessed data/data stream 516 is then sent to the processing unit (not shown here) to further processing the data/data stream to have data that can provide decision on some action or reaction based on the environment of experience to act. Additional one or more electronics mean (not shown here) may require to process the data to final output providing information that can provide a decision for some action to act.

Figure 5B:
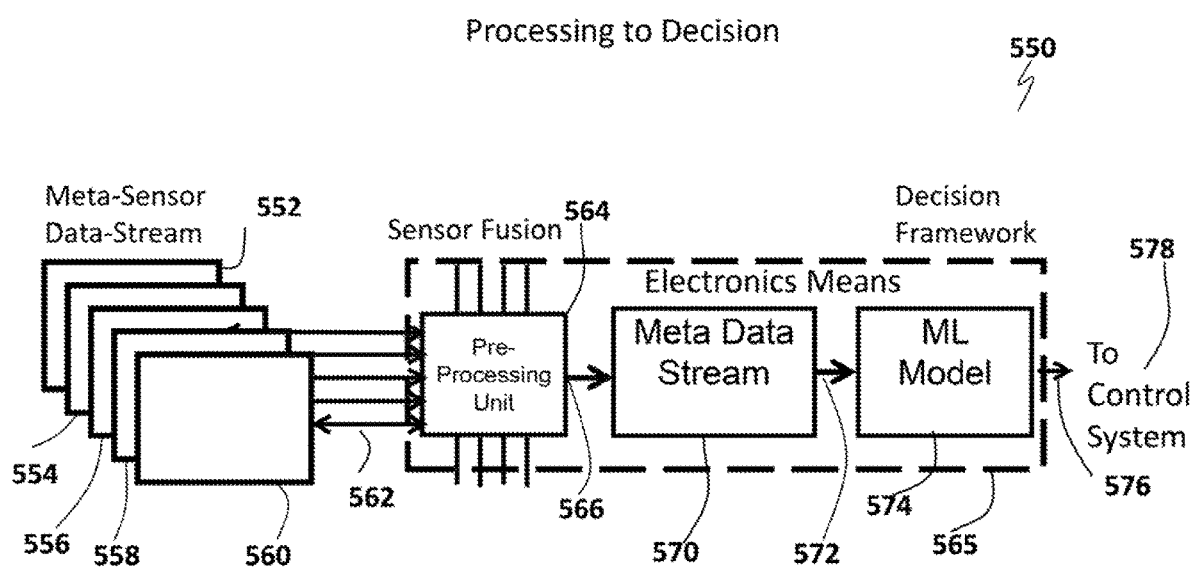
FIG. 5B is a schematic showing preprocessed sensor fusion data-stream, wherein each of Multiple sensors generates their own separate data streams and each data stream is processed in a electronics means wherein further the data-stream or singled fused data stream is processed Via a machine leaning (ML) model to achieve final decision to act.

FIG. 5B is a schematic showing an alternative embodiment of processing data after a single meta sensor or a multiple meta sensor in the preferred embodiment according to this invention. In way of an example not way of limitation, in meta sensor platform 550 the data stream from multiple sensors including, but not limited to a imaging sensor, radar, a ranging sensor, other sensors, or a combination thereof, included into to the single meta sensor or the multiple meta sensors, each generates data streams of 552, 554, 556, 558, and 560. Each data stream 562 can be sent independently or parallelly to a preprocessing unit (e.g. a processor, a microcontroller) 564 located in an electronic means 565 to have a sensor fusion data 566 or multiple sensor fusion data. The resulting output 572 is a single fused data stream 566 or multiple fusion data (not shown here), which comprises a Meta data-stream 570 or multiple meta data-stream that is sent to a machine leaning (ML) model 574 into the electronic means 565. The output of the ML model is a decision 576, which is an information of decision (i.e. human-like decision), on some action or reaction based on the environment of experience, and sent to the control unit 578. The meta sensor platform processing 550 significantly reduces the amount of data generated, prepacked and sent to the unit (not shown here). This is more efficient, very fast and eliminated a lot of redundancies, which enables the meta sensor platform to make quick human-like decision making necessary for autonomous systems. Additional one or more electronics mean (not shown here) may require to process the data to final output providing information that can provide a decision to send to the control unit (not shown here) for some action to act.

Figure 5C:
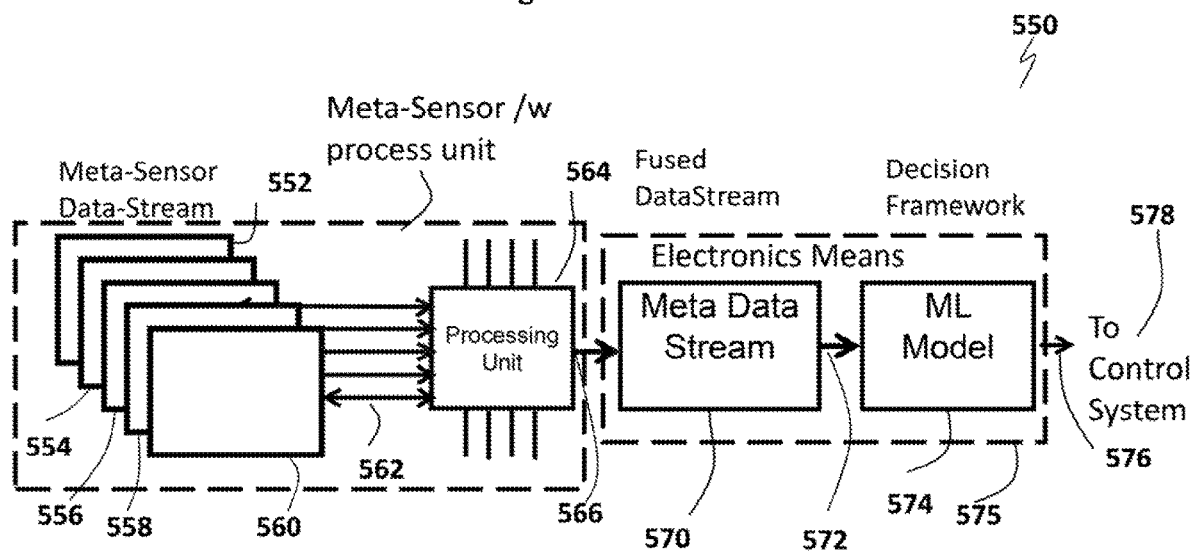
FIG. 5C is a schematic showing another alternative embodiment, wherein a preprocessing in Meta-sensor is followed by decision making Via a machine leaning (ML) model.

FIG. 5C is a schematic showing an alternative embodiment of processing data after a single meta sensor or a multiple meta sensor in the preferred embodiment according to this invention, wherein like numerals represent the like parts, as explained in FIG. 5B, so that repeated explanation is omitted here. According to this invention, in way of an example not way of limitation, the main difference in FIG. 5C with FIG. 5B is that the processing unit is part of a single meta sensor or a multiple meta sensor (not shown here). Herein, the meta sensor send the preprocess data to do further process the data in a electronic means to obtain the decision information as explained in FIG. 5B. Additional one or more electronics means (not shown here) may require to process the data to final output providing information that can provide a decision to send to the control unit (not shown here) for some action to act. Alternatively, the electronic means 575 in FIG. 5C or electronic means 565 in FIG. 5B, can be a part of a meta sensor (not shown here).

Figure 6A:
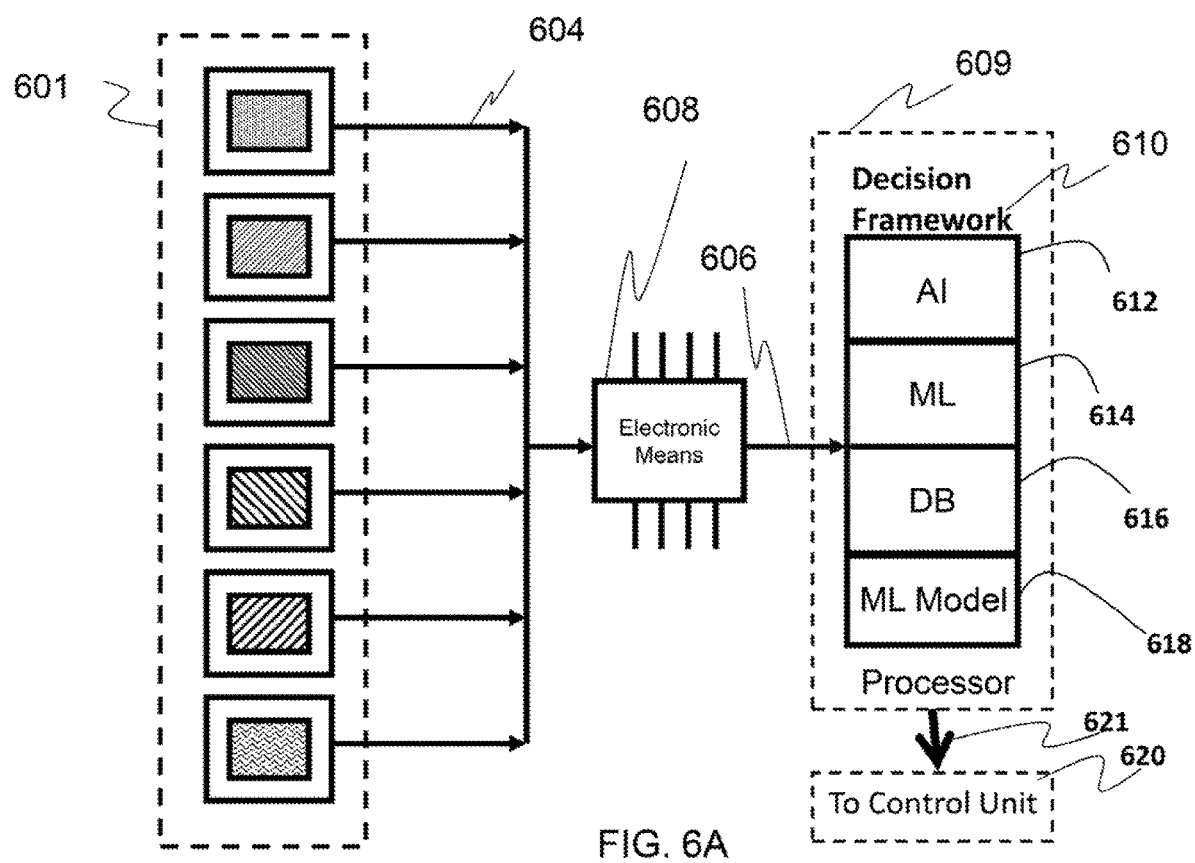
FIG. 6A is a schematic showing data generation from meta-sensors to the decision in the preferred embodiment, wherein there are several Meta sensors connected to an integrated chip. Wherein the integrated circuit unit fuses the data into a single combined data stream/multiple stream and sends the combined data stream onward to the decision framework in Electronics means. The results of decision framework then send information to the control unit.
Figure 6B:
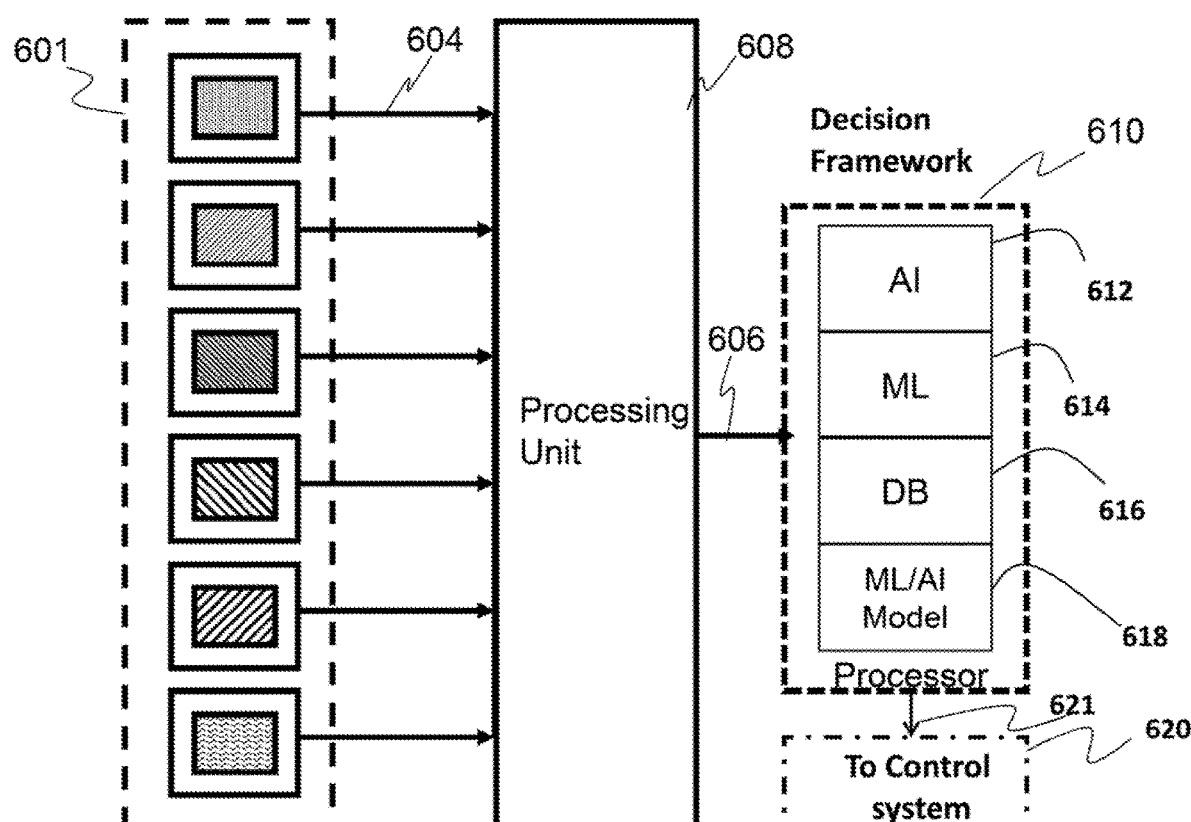
FIG. 6B is a schematic showing data generation from meta-sensors to the decision in an alternative embodiment, wherein single or multiple Meta sensors connected to processing unit for preprocess the data into a single combined data stream/multiple stream and sends to the decision framework in Electronics means. The results of decision framework then sends information to the control unit.

FIG. 6A is a schematic showing an meta-sensor and its processing scheme in the preferred embodiment according to this invention. According to this invention, a single or a multiple meta-sensor 601 whether they are hybridly integrated or monolithically integrated is used in the meta sensor system. In the case of multiple meta sensors 601, each meta sensor may have a single or more than one functionalities and 601 may comprise of multiple, similar, or combination thereof functionalities. Alternatively, the Meta sensors may homogeneous, (wherein all of the sensors are the same type) or heterogeneous (wherein numerous different type of sensors are used), or a combination thereof. The Meta sensors 601 generate a signal and send those signal as analog or digital data streams 604 to the electronic means 608 in parallel or in serial. The data stream 604 to electronic means 608 can be sent in serially from each meta sensor or in parallelly (not shown here). The information extracted from data stream 604 coming from the different meta-sensors are "fused" in to a single fused data stream 606, or parallelly (not shown here) and passed to the decision framework 610 in the processor 609. The Decision Framework 610 comprises an artificial intelligence (AI) algorithms module 612, a machine learning (ML) module 614 capable of training, a database 616 for recording knowledge information as well as for reference purposes, or a AI model/ML model 618, or a combination thereof. The decision framework 610 may have all or in parts of items (612, 614, 616, 618) as mentioned. The database 616 may have previous data and/or current generating data for storing for future training, if necessary. Alternatively, the decision framework may comprise of a AI model and/or a ML model, which produces human-like decision information 621 that are sent to the control unit 620 to act FIG. 6B is a schematic showing an meta-sensor/meta sensors and its/their processing scheme in an another preferred embodiment according to this invention, wherein like numerals represent the like parts as explained in FIG. 6A, so that repeated explanation is omitted here. The differences between FIG. 6B and FIG. 6A are that in FIG. 6B, the data 604 from meta sensors are sent to processing unit 608 (may different from an electronic means) and generates a processing data 606 to the decision framework 610 which is in another processing unit 609, and the data coming from each meta sensor or different meta sensor are fed to the processing unit 606 in parallelly. The processing data 606 can be a single data stream or multiple data stream carrying a or multiple information, and fed to another processing unit 609 (in parallel (not shown here) or in serial), wherein decision framework 610 is located. The processing units 608 and 610 could be a single processing unit or multiple processing units, and they can be separately located side by side in close proximity in the system, hybridly integrated or in monolithically integrated in a single integrated chip or multiple integrated chip. Further alternatively, the processing unit 608 can be a part of the meta sensors (not shown here), wherein the processing unit 608 is hybridly integrated with the meta sensor 601, or monolithically integrated in part or in whole, or a combination of hybrid and monolithic integration (not shown here). Alternatively further, the processing unit 608 and the processing unit (processor) 610 can a single or multiple integrated chips, and they are a part of meta sensor, wherein the processing units 608 and/or 608 are hybridly integrated in whole or in a part, with meta sensor 601 (not shown here), or in monolithically integrated in whole or in a part, with meta sensor 601. Alternatively, in another embodiment, the decision framework may comprise of AI model and/or ML model, which produces human-like decision information 621 that are sent to the control unit 620 to act.

Figure 6C:
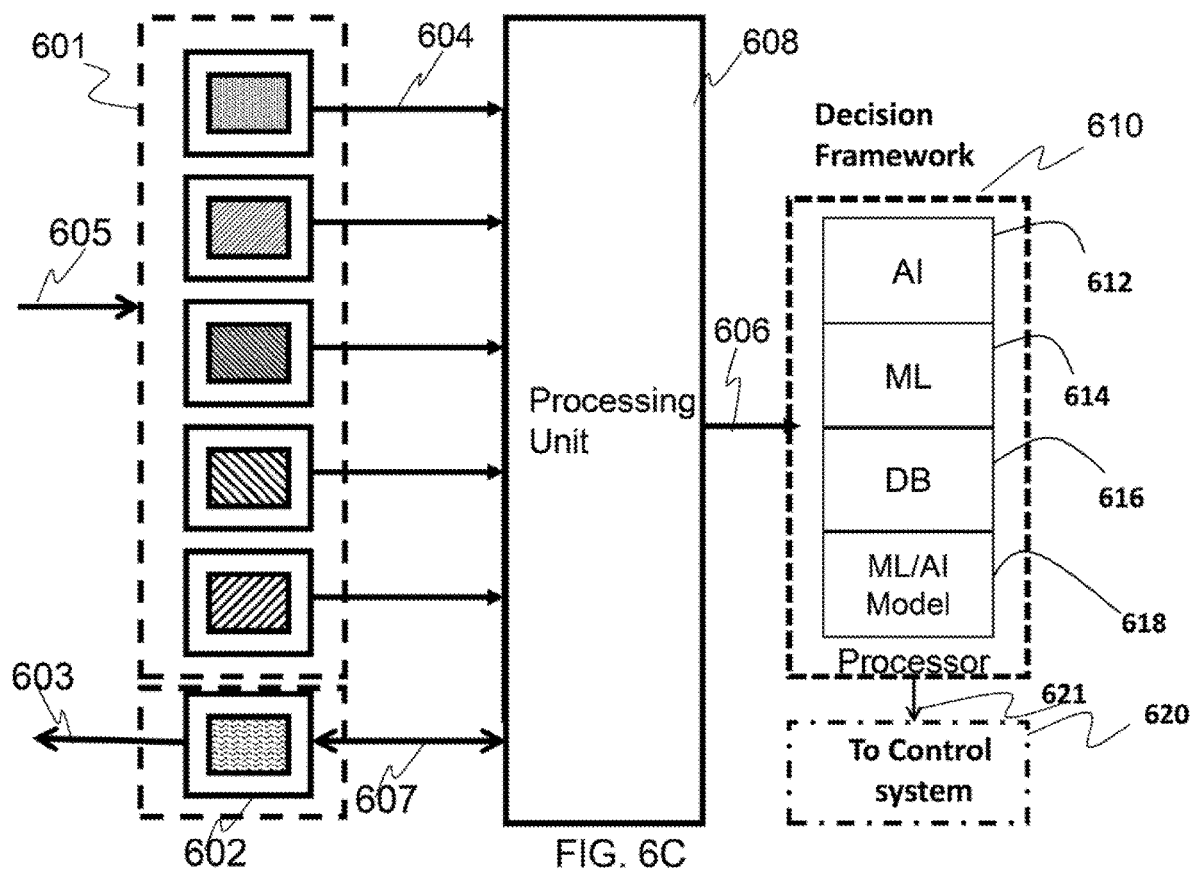
FIG. 6C is a schematic showing data generation from meta-sensors to the decision in an alternative embodiment, wherein single or multiple Meta sensors connected to processing unit for preprocess the data into a single combined data stream/multiple stream and sends to the decision framework in Electronics means. The results of decision framework then send information to the control unit. The preprocess unit is connected to the emitter to generate the radiation and reflected or transmission radiation from the object coming to the meta-sensor, generating a signal based on the objects

FIG. 6C is a schematic showing an meta-sensor/meta sensors and its/their processing scheme in an another alternative preferred embodiment according to this invention, wherein like numerals represent the like parts as explained in FIGS. 6A and 6B, so that repeated explanation are omitted here. The differences between FIG. 6C and FIG. 6B are that in FIG. 6C, an emitter unit 602 is used and a part or separate from a meta sensor, and creates a radiation 603 having a band or multiple bands of wavelengths, and scanned or projected on the scene continuously or in periodically in specific time period. The reflected radiation 605 from a object in scene are generated after reflected from the object or illuminated or incident on the meta sensor 601. The reflected radiation can have a same band of wavelength as that of the emitted radiation 603, or different from that of the emitted radiation wavelength, or a combination thereof. The emitter comprises of a single emitter or multiples emitters that can generate a same or a multiple wavelength of radiation. The time at which the emitter generates a emitted radiation (a single ray or multiple rays) emits from a emitter and the time that reflected radiation incident to a meta sensor are precisely captured by a electronic means (not shown here) or a processing unit 608 which can generates a difference in timing and accordingly generates distance between a point on the objects to the meta sensor. Based on the different distances from a different point of the objects, can generate the curvature of the object or depth of the object, or depth of a image in the scene. Similarly, the meta sensor can also create the scene image from the reflected radiation which can be a part of reflected radiation from nature light (exist in the scene) and/or reflected radiation from the emitted radiation. Others explanation related to like parts and/or their alternative embodiments are already explained in FIGS. 6A and 6B, so that repeated explanation is omitted here. The emitter unit 603 and meta sensor 601 can be a separate unit, discretely integrated, or in integrated into a meta sensor. In the case of separate units or a same unit, the timing information 607 mentioned herein can be extracted from a signal form the meta sensor (not shown here) and/or also the timing at which radiation is emitted by a electronic means or the processing unit 608.

Alternatively, in another embodiment, the data stream s feeding into the electronic means 608 may not be a meta sensor, but based on other independent sensors, such as cameras, IR sensor, motion sensors, thermometers, or any other sensor required by the specific system, or a combination thereof. In way of an example not way of limitation, a meta sensor system (not shown here) of an automobile will have several meta sensors detecting the surrounding of the vehicle while also having access the other sensors in the vehicle, such as a speedometer, tachometer, thermometer, etc.

Alternatively, in another embodiment, the electronic means 608 may only receive data from the Meta Sensors 601, and data from other sensors is transmitted directly to the decision framework 610, where the data from other sensors is analyzed alongside in serially or parallelly or with the data from the Meta sensors.

Alternatively, in another embodiment, the pre- or post-process sensor data stream as shown in FIGS. 5A, 5B, and 5C may be used in an embodiment of FIG. 6 where the Meta sensors 601 send the data directly to a processor unit (not shown here) where a processor unit 620 then analyses the data-stream and undergoes the decision framework 610

Figure 7:
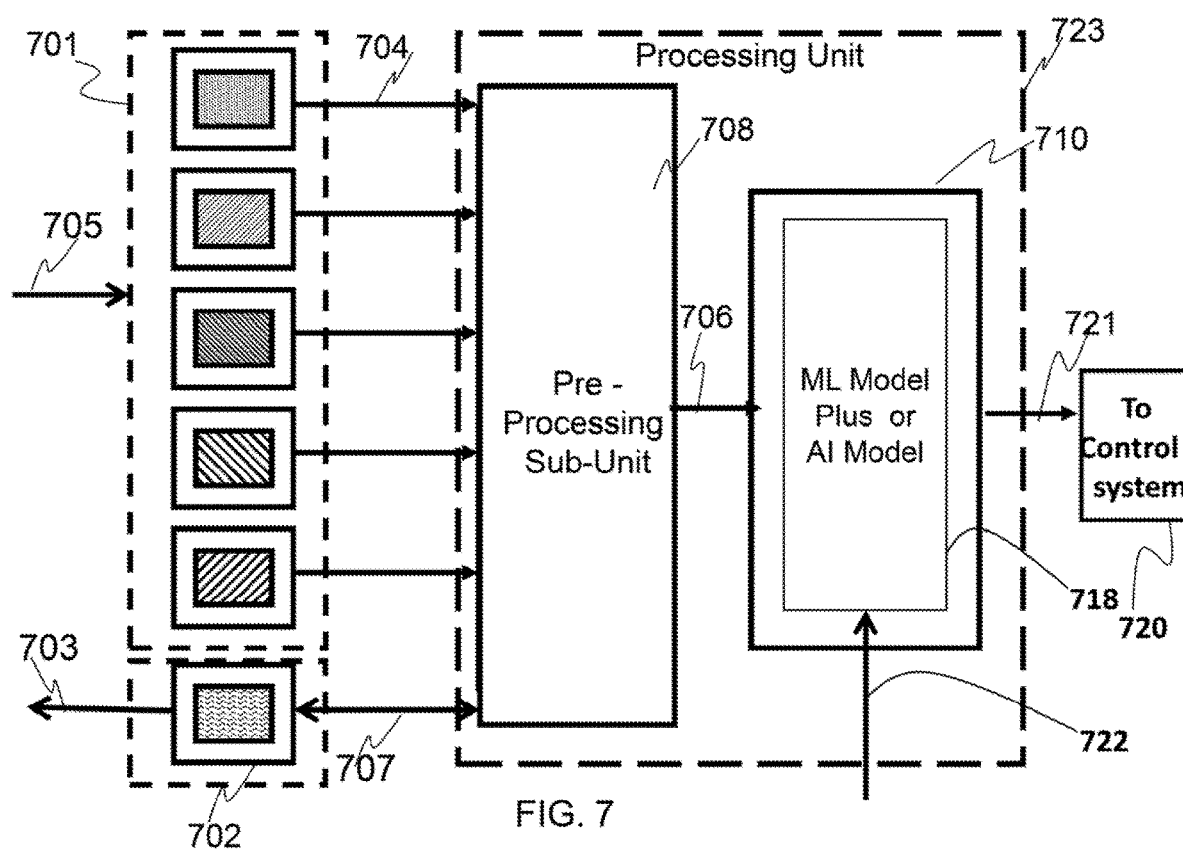
FIG. 7 is a schematic showing data generation from a single meta sensor or multiple meta-sensors, emitter, preprocessing unit, processing unit, to the decision in an alternative embodiment, wherein single or multiple Meta sensors connected to preprocessing unit for preprocess the data into a single combined data stream/multiple stream to the main processing unit (post-process) in the decision framework in Electronics means to generate the decision to transfer to the control unit/system. The preprocess unit is connected to the emitter to generate the radiation and reflected or transmission radiation from the object coming to the meta-sensor, generating a signal based on the objects.

FIG. 7 is a schematic showing an meta-sensor/meta sensors and its/their processing scheme in an another alternative preferred embodiment according to this invention, wherein like numerals represent the like parts as explained in FIGS. 6A, 6B, and 6C, so that repeated explanation are omitted here. The differences between FIG. 7 and FIGS. 6A to 6C are that in FIG. 7, processing unit 723 comprise of a processing unit 708 (mentioning as pre-processing sub unit), and/or a section 710 under the processing unit 708, wherein the section 710 having a trained model 718 or multiple model which comprises a ML model, a DL model, or a AI model or others model, or a combination of thereof to process the incoming data/data stream 706 to provide a decision information 721 to send to a control unit 720. Alternatively, the processing unit 708 could be a part of meta sensor, as explained in FIGS. 6A to 6C. Alternatively, the trained model (i.e. ML) 718 can be a model or multiple models for different similar (i.e. ML) model which are created after training of different data sets (not shown here) or unified model (wherein the different similar model for example creates an unified (trained) ML model). Alternatively, the decision information 721 may come after a single trained model processing or multiple similar model processing (not shown here), and that can be one single decision information or multiple decision information (human like) 721 to send to a control unit 720 to act. A new trained model 722 can be generated from the peripheral electronic means (not shown in FIG. 7) having a new dataset, and fed to the model 718 for update and/or act as a separate similar decision model (not shown here) to create decision information to send to the control unit. Others explanation related to like parts and/or their alternative embodiments are already explained in FIGS. 6A, 6B, and 6C, so that repeated explanation is omitted here.

Figure 8:
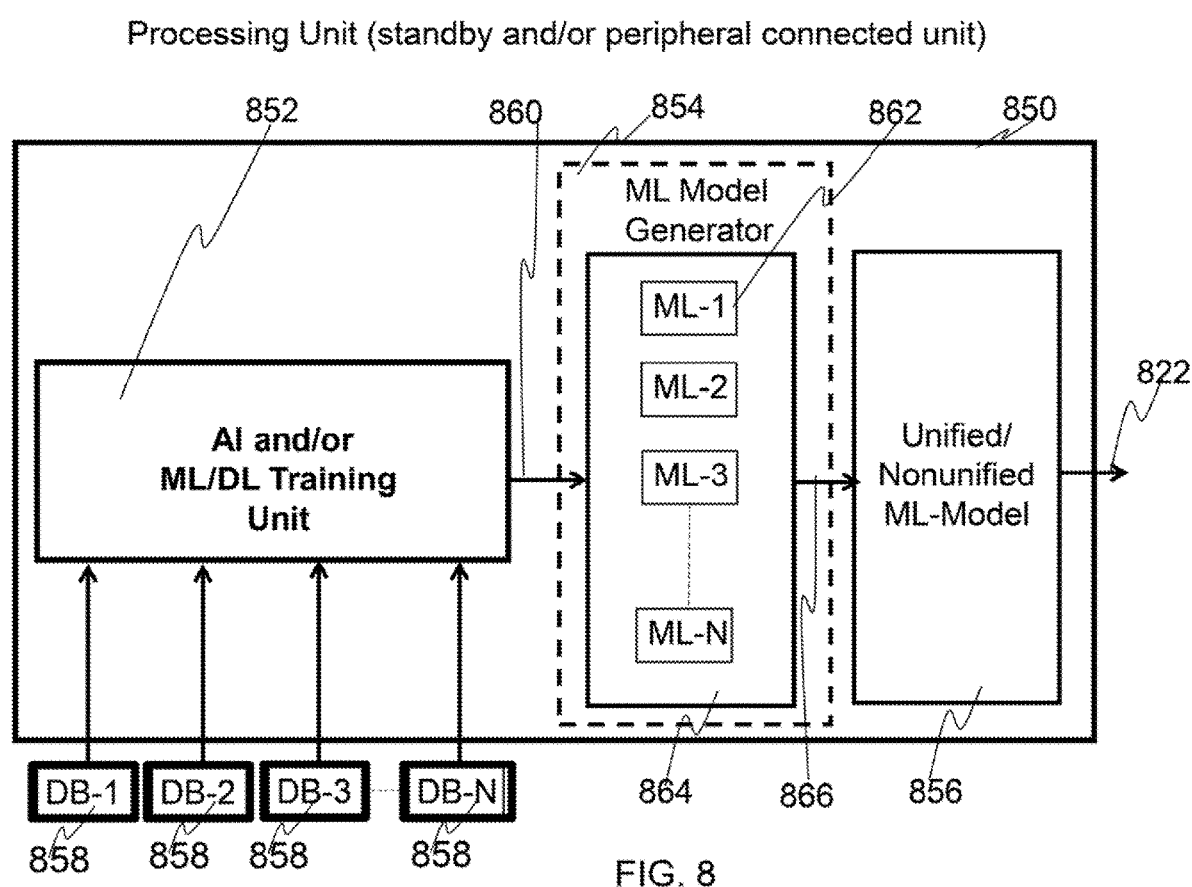
FIG. 8 is a schematic showing a processing unit which could be used for creating the machine learning model from a single data-base or multiple data-bases, or new data-base (for including as additional for updating Machine learning models in the preferred embodiment according to this invention. The data can be input to the autonomous system with the helps of peripheral devices (e.g. USB, flash drive) and/or downloaded from remote location using a private network. Once generated the new ML model or updated ML model, that could be input to the existing autonomous system for processing.

FIG. 8 is a schematic showing a processing unit in the preferred embodiment, wherein like numerals represent the like parts as explained in FIG. 7, so that repeated explanation is omitted here. In way of an example not way of limitation, the processing unit 850 in FIG. 8, has a single or multiple section performing function including, but not limited to a model training section 852, model generator/keeping section 854, and/or model unified section 856. Alternatively, according to this invention, the model training section 852 and model keeping section/generator 854 can be an one unit. Alternatively, in an another embodiment, the model generator/keeping section 854 and unified model generator or model keeping section 856 can be an one section. In an another embodiment, the training section 852, model generator/keeping section 854, and unified model generation section 856 can be an one section (not shown here) located in the processing unit 850. The training unit/section 852 has a single or a multiple inputs and/or peripherals to feed through the existing and/or new database 858 to the training section 852 to train and create a model or multiple models 860 based on the datasets/databases. The created model 860 is sent to the model generator/model keeping section 854. The data base may have a single database or multiple databases feed to the training section 852. The model 860 created based on the training, comprises a ML model, AI model, DL model, or a combination of thereof. Alternatively, each similar (homogeneous) model again comprises of a single homogeneous model or a multiple homogeneous models 862 (e.g. ML1, ML2 and so on) and they are located in a subsection of 864 of section of 854. Alternatively, in an another embodiment, multiple databases may feed to the training section 852 in parallel or serially, or a combination thereof. The training section 852 may create a model or multiple model that can send to the model generator/model keeping section 854. In an the preferred embodiment, one single similar (homogeneous) model can be generated from each database of 858. Alternatively, in an another embodiment, one similar (homogeneous) model (e.g. a ML) is generated out from all databases in 858. According to this invention, in way of an example not way of limitation, in another embodiment, one single heterogenous model can be generated from each database of 858. Alternatively, one heterogeneous model (e.g. a ML) is generated out from all databases in 858. In another embodiment, a single or multiple generated models 866 whether they are homogeneous, heterogeneous, or a combination of thereof, may send to the unified section 856 to provide a unified model or multiple unified models 822 to send/store in decision framework (or aggregator perception engine) as explained in FIGS. 4 to 7. The related repeated explanation is omitted here In FIG. 8, the processing unit 850 is included a standby o peripheral processing unit to train and create/update the model. Alternatively, the processing unit 850 may be a part of the processing unit in meta sensor processing scheme, or as an additional processing unit which may use for updating the model using existing and/or new datasets (not shown here)

Figure 9:
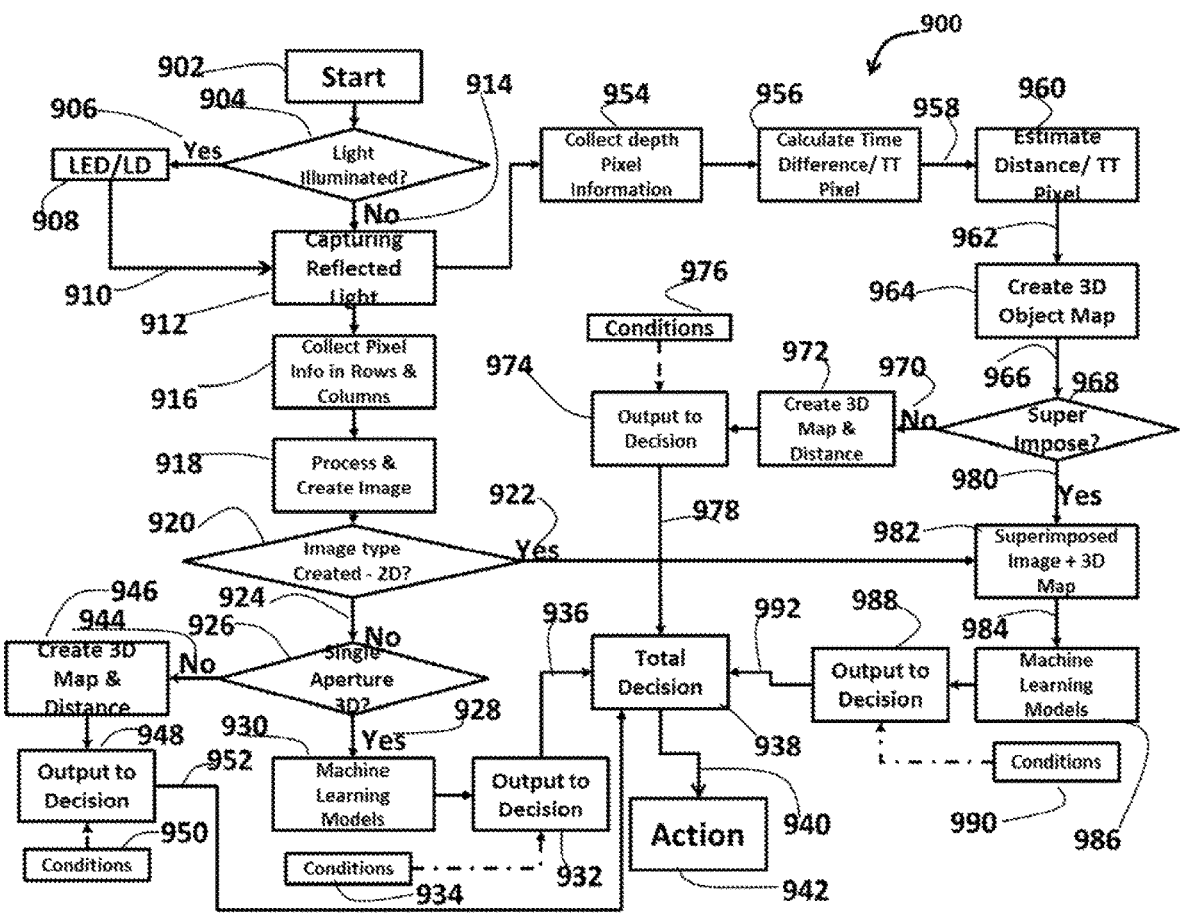
FIG. 9 is an example of an embodiment, illustrating a flow-chart for data processing in the autonomous system in the preferred embodiment, according to this invention

FIG. 9 is a schematic showing a flow-chart of signal/data processing of a meta-sensor and its processing scheme in the preferred embodiment as an example according to this invention. According to this invention, in way of an example not way of limitation, processing flow chart 900 starts at 902, and meta sensor system makes a determination on whether light (radiation) illumination 904 is required or not. When light (a.k.a. radiation) illumination is required 906, a light source 908 such as an LED or a laser diode (LD) or a similar light source that is used for illuminating the scene is turned on. The light (radiation) source 908 generates a light beam in a scanning or pulse mode at various time intervals. The generated light pulse is transmitted to make illuminating to a target scene, and any object in its path reflects the light back 910 to the meta sensor, which captures the reflected light 912, and is shown in more details at pixel level in FIGS. 2A to 3. A light beam reflected from some different points located on the object is made to incident to a pixel/or multiple pixels located in the meta sensor at a various time such as $t_1$ to $t_n$ which is based on the curvature of the object, as explained in FIGS. 1A to 3. The repeated explanation is omitted here. In the case where no light illumination is required 914, the CITOFA sensor captures the reflected light 912 already available from the scene. The light captured by the CITOFA sensor 912 is processed according to the type of pixel of the sensor that is receiving the light i.e. an imaging pixel or a depth pixel.

In the first case of imaging pixels, shown in details in FIGS. 2A to 2B, the imaging pixels collect image information in rows and columns 916. The image pixel information is used to process and create images (e.g. scene image) of various kinds 918. The system can make a determination at 920 regarding the type of image that should be generated for example a standard 2-dimensional (2D) image, and/or a 3-dimensional (3D) image (e.g. 2D image with depth profile), or a combination thereof. According to this invention, in way of an example not way of limitation, if a 2D image is required 922, the signal/data is processed which can create a 2D scene image (not shown here) and/or sent the scene information based on the necessary to the electronics means, and/or peripheral devices for stored as database/datasets, as explained in FIG. 8.

Alternatively, the 2D scene image information is processed as an input elsewhere in the system to superimpose onto a 3D map. In the case where a 3-D image should be generated 924, then the system makes a determination whether the image capture apparatus is a single aperture or otherwise 926. In the case of a single imaging aperture apparatus 928, the output image is transmitted to one or more machine learning (ML) models 930 for processing. The output information is sent to a decision module 932 where it is processed and evaluated according to any conditions 934, if any, that are applicable to the ML model 930 for an interim, or final decision 936. Thereafter, the interim or final decision 936 is send to a total decision module 938 whereby it is evaluated in the context of any and all available and applicable interim decisions (e.g. 936) to facilitate the generation of a total, comprehensive and final decision 940. This total decision 940 is the basis for action 942 that is initiated or invoked by the system. In an another embodiment, wherein more than one apertures creating multiple scene images for example double, triple or more imaging apertures are used 944, the output image is transmitted to a module 946 for creating a 3D map and/or image with depth profile, which may or may not include distance information (e.g. distance from an object in scene to sensor). The output of the 3D map with or without distance module 946 is sent to a decision module 948 where it is processed and evaluated according to any conditions 950 that are applicable for an interim decision 952. Thereafter, the interim decision or final decision 952 is send to a total decision module 938 whereby it is processed according to the same procedure already explained and not repeated here to have final decision to have action in 942.

In the second case of depth pixels (e.g. TT Pixels), shown in details in FIGS. 2C to 2E, the pixels collect travelling time information 954 of the reflected beam explained earlier after reflected from pints of curvature of the objects in the scene, and those travelling timing information are used to process distance and generate 3D maps of objects. The depth pixels (also mentioned as TT pixels) collect reflected light after reflected from the objects in the scene, at a time interval, which is a time difference between the time at when the light bean is projected/emitted from a radiation source (e.g. LD/LED 908) and the time at when the depth pixels receive the reflected time. The depth pixel information 954 is sent to a time difference calculation module 956, which calculates the difference in time elapsed $\Delta t_1$ between a light pulse emitted at time $t_1$ and synchronized to a depth pixel (e.g. depth pixel 1), and the time at when reflected light arrived at the depth pixels after reflected by a target object in the scene and received by depth pixel (e.g. the same depth pixel 1). Similar calculation is repeated for each of k×p depth pixels (forming TT pixels array) in the meta-sensor array to obtain k×p numbers of timing interval information such as $\Delta t_1, \Delta t_2 \ldots \Delta t_n$ in the k×p array format as already explained in details in FIGS. 2C to 2E. The output time difference information for each depth pixel 958 is transmitted to a distance estimation module 960, where it is used to estimate the distance of the object from the sensor per each depth pixel timing information. The output 962 is transmitted to a 3D object map creation module 964 where it is used to generate a 3D object map 966 of the object in the scene. The system then makes a determination 968 on whether the resulting 3D object map 966 needs to superimposition or not on to the scene image. In the case where image superimposition is not required 970, the 3D object map is sent to a 3D map and distance creation module 972 where processing is completed. The output information is then sent to a decision module 974 where it is processed and evaluated according to any conditions 976 that are applicable for an interim or final decision 978. Alternatively, in another embodiment, the 3D object map, and/or image information sent to the trained models (e.g. ML model, AI model) to have interim or final decision for any conditions 976. Alternatively, the 3D object map, and/or image information also are also sent to the electronics means and/or peripheral devices to store for future training the system/machine (not shown here). After interim or final decision 978 is obtained, that decision information is transmitted to a total decision module 938 whereby it is processed according to the same procedure already explained and not repeated here to achieve action 942.

In the case where image superimposition is required 980, the 3D object map 966 is sent to a superimposition module 982 where it is superimposed with a 2D scene image 922. The output superimposed 2D image and 3D map 984 is transmitted to one or more machine trained models (e.g. machine learning (ML) models) 986 for processing. The output of the ML model 986 is sent to a decision module 988 where it is processed and evaluated according to any conditions 990 that are applicable to the ML model 986 for an interim decision 992. Thereafter, the interim or final decision 992 is transmitted to a total decision module 938 whereby it is processed according to the same procedure already explained and not repeated here to achieve action 942. Alternatively, in another embodiment, conditions module (e.g. 990) can be include in to a module 986 wherein thereafter, the interim decision 988 is obtained and is transmitted to a total decision module 938 for getting the system final decision 942.

Various way of information/data processing can be done. In FIG. 9, one example is explained in way of an example not way of limitation.

Figure 10A:
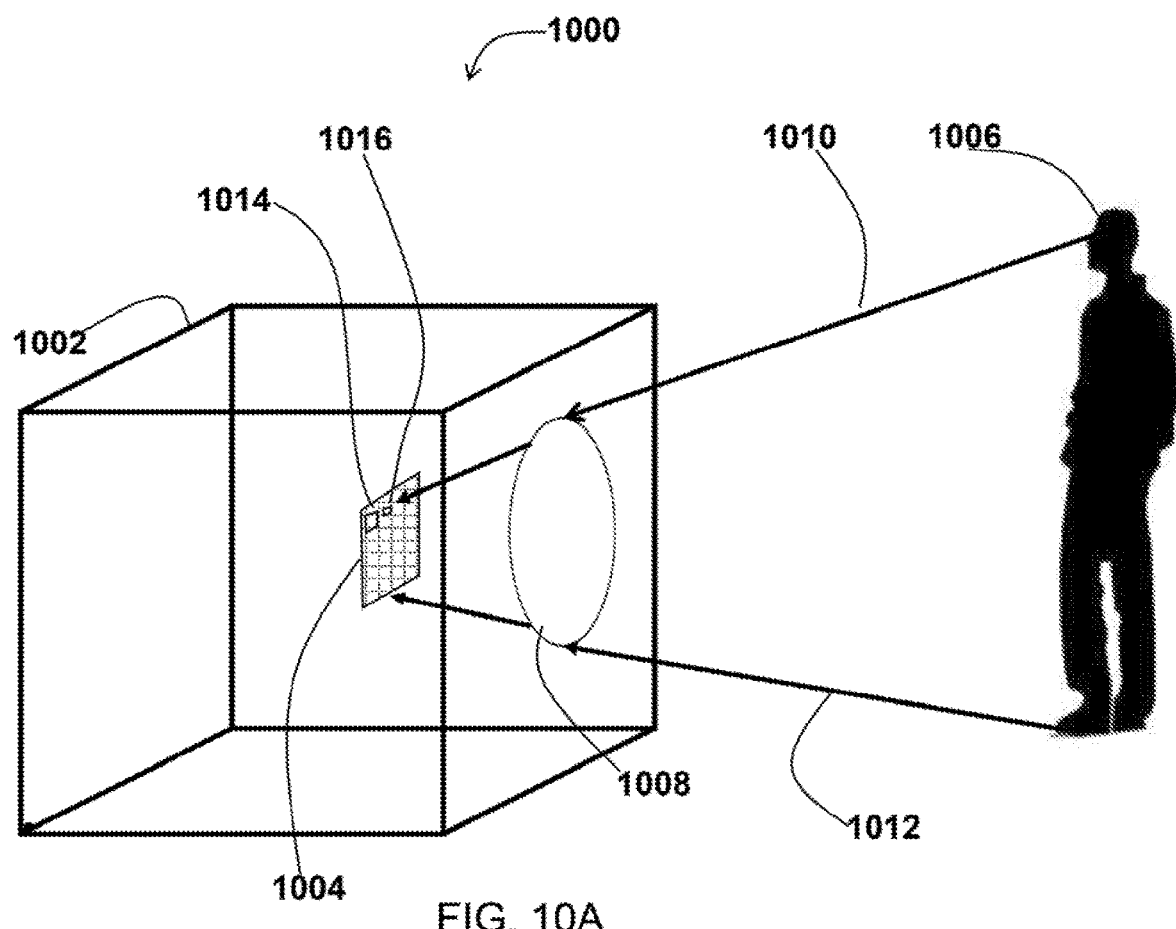
FIG. 10A is a schematic of meta-sensor system for autonomous vehicle in the preferred embodiment according to this invention.

FIG. 10A is a schematic illustrating a meta sensor system along with its object detection method in the preferred embodiment, according to this invention. The meta sensor system 1000 comprises a module 1002 in which a meta sensor 1004 may be mounted on to a package, module or board, which is not shown here, for the purpose of capturing a 2-D or 3-D image of an object 1060 including a 3-D map and distance measurement according to this invention. The meta sensor system 1002 may include a optics 108 (e.g. a lens), which is used to focus reflected illumination 1010 and 1012 of the object and captured by the sensor 1004. The light captured is processed by the sensor according to the type of pixel receiving the light including the pixels 1014 used for processing 2D images, and the TT pixels 1016 used for processing 3-D mapping and distance as explained in more details in FIGS. 1A to 9.

Figure 10B:
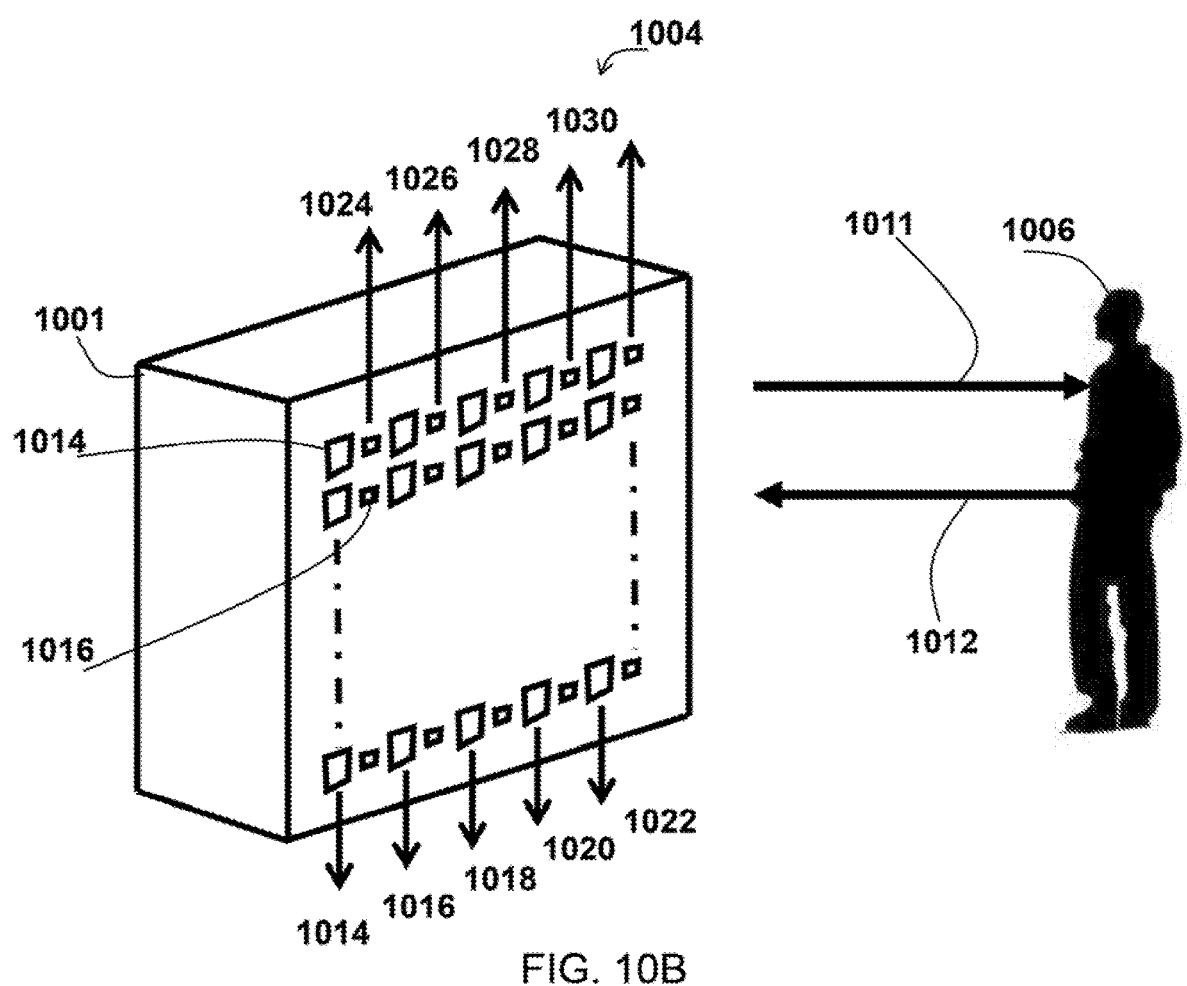
FIG. 10B is a schematic of meta-sensor showing side view device in the preferred embodiment, according to this invention.

FIG. 10B is a schematic of a meta sensor illustrating a combination of imaging pixel and TT pixel in the preferred embodiment according to this invention wherein like numerals represent the like parts as explained in FIG. 10A, so that repeated explanation is omitted here. The sensor device 1004 comprises of a selection of various substrate materials suitable for fabricating integrated circuit devices including visible imaging devices including, but not limited to silicon (Si). The sensor device 1004 comprises a 2-dimensional array of pixels of N rows by M columns. Either using emitted light 1011, or not, the sensor captures light 1012 reflected from an object 1006 to process a 2-D image and a 3-D map and distance of the object 1006 according to this invention. The sensor device 1004 array comprises of several types and configurations of pixels including, but not limited to imaging type pixels 1014 explained in more details in FIGS. 1A to 2E, and TT type pixel 1016 explained in more details in FIGS. 2C to 2E. According to this invention, in way of an example not way of limitation, the imaging type pixels 1014 and TT type pixels 1016 are arranged in an alternating pattern throughout the N×M sensor array 1004.

Figure 11A:
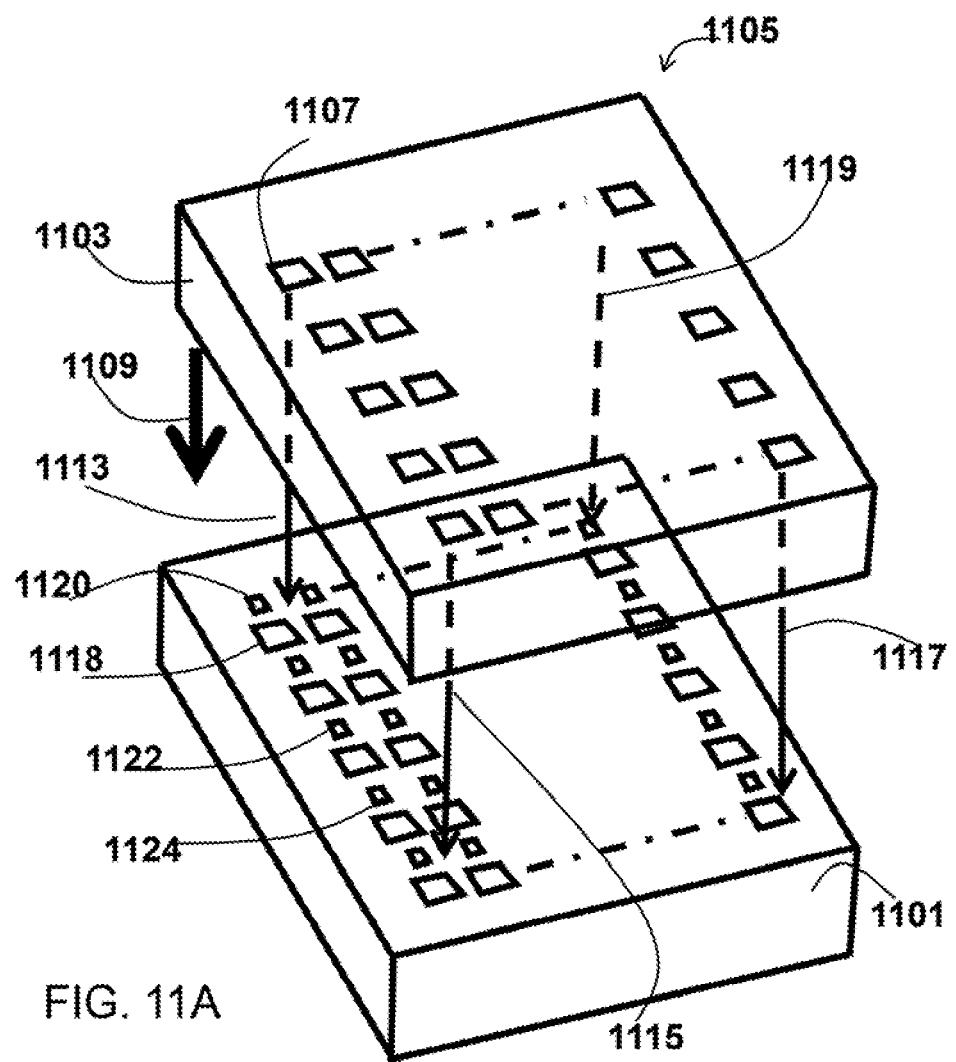
FIG. 11A is a schematic of meta-sensor showing a side view wherein the meta-sensor is made based on two chips, wherein optical (especially IR or Visible plus IR) to electrical conversion will be based on the one chip, and electronics signal processing in an another chip or multiple chips, in the preferred embodiment, according to this invention.

In the processing of the imaging pixel data for the meta sensor device 1004, data is shifted out simultaneously for each image pixel column 1 to column m−1 skipping every other column which is of type TT pixel, as shown by 1018, 1020, 1022, 1024, and so on for each odd-numbered column to the M−1$^{th}$ column in a meta sensor of N×M array of pixels. According to this invention, in way of an example not way of limitation, a shift register can be used to shift the imaging data, which is shifted along the column to an one side (e.g. bottom) of the meta sensor device 1004 for processing the data to a or multiple electronics means (not shown here). Depending on the electronic configuration and physical location of the shift registers, the imaging pixel data could also be shifted in an opposite side (e.g. upward) direction to the top of the sensor device 1004. The image pixel data is used to obtain a 2-D image of the object 1006. Similarly, in the processing of the TT pixel data for the sensor device 1004, data is shifted out simultaneously for each TT pixel column 2 to column M skipping every other column which is of type imaging pixel, as shown by 1026, 1028, 1030, 1032, and so on for each even-numbered column to the M$^{th}$ column. According to this invention, in way of an example not way of limitation, a shift register can be used to shift the TT data, which can be shifted along the column to the top of the sensor device 1004 into registers not shown here. Depending on the electronic configuration and physical location of the shift registers, the TT data could also be shifted in a one side (e.g. downward) direction to the bottom of the sensor device 1004. The TT pixel data is used to obtain a 3-D map and distance of the object 1006. Further, the 2-D image, the 3-D map and distance information of the object 1006 are processed, as described (as for example) in details the meta sensor system process flow chart FIG. 9 and repeated explanation is omitted here. The meta sensor is made from material from a group consisting of Si, Ge, InP, GaAs, GaN, ZnO, CdTe, PbS, GaSb, HgCdTe, HgTe, ZnTe, ZnS, and a combination of thereof. The detector for both image pixel and TT pixel are the same type of detector (i.e. Si photodetector) to sense/detect the visible wavelengths. Alternatively, a photodetector or multiple photodetector can be used for both Imaging pixel and/or TT pixel, converting the optical signal to electronic signal. The photodetector can be made from the material mentioned above to convert the optical to electronics signal, and the photodetector can be made from a p-n junction, p-i-n junction, Schottky junction or a combination thereof. Alternatively, the optical to electronic signal can be made using a or multiple detector based on photoconductive type. The detector can be monolithically integrated on a single substrate with electronic means processing the electronic signal or hybridly integrated with the electronics means in a separate substrate and afterwards, bonding by using a method for example chip-to-chip bonding, or flip-chip bonding (not shown here). According to this invention, in way of an example not way of limitation, alternatively, the photodetector receiving reflected radiation from an object in the scene can be a same type of photodetector or different type photodetector. For example, photodetector in image pixel and TT pixel can detect the same or different radiations having a band of wavelengths radiation. Alternatively, filter can be used in front of photodetector to detect different band of wavelengths, and the same type of detector can be used for both image pixel and TT pixel FIG. 11A is a schematic showing a meta sensor in details in an alternative embodiment according to this invention, wherein a like numeral represents the like part explained in FIGS. 10A and 10B, so that repeated explanation is omitted here. In FIG. 11A, the meta sensor 1105 comprise of infrared (IR) based detector (that detect IR radiation) for image pixel and visible (that detects visible radiation) detector. The detector array that is a part of an image pixel is made in a separate substrate (e.g. InP) 1103 and the detector is design to detect a band of IR spectrum. The TT pixel with readout electronics for both image pixel and TT pixels are mad in another substrate (e.g. Si). Two substrates ate bonded using chip-to-chip bonding, or flip-chip bonding using bumps on the pixel contacts, located in both substrates. The detector array for image pixel 1105 comprises a 2-dimensional array of pixels of n rows by m columns whereby the pixels 1107 are of the imaging type. Further, the imaging pixels 1107 are sensitive to the detection of light in the infrared (IR) spectrum which may be a part of radiation or a band of radiation, falls under wavelengths or band of wavelengths from 0.9 µm to more than 25 µm, depending on the substrate materials used for making a detector array in substrate of 1103. The substrate 1103 is bonded from the top 1109 to the meta sensor 1105 such that each detector 1107 and so on along then rows and m columns is aligned 1113, 1115, 1117, and 1119 with a corresponding imaging pixel 1118 and so on along the n rows and m columns, on the meta sensor 1105. The bonding of the detector arrays 1107 and the another substrate carrying electronic means and TT detector makes a meta sensor 1105, which enables the IR imaging of the meta sensor 1105. The image pixel data is used to obtain a 2-D IR image of the target object not shown here. Further, the TT type of pixels (e.g. 1120, 1122, 1124) and so on along the N rows and M columns, on the meta sensor 1105 will capture reflected light for traveling time (TT) processing as already explained in more details in FIGS. 1A to 8. and not repeated here. The TT pixel data is used to obtain a 3-D map and distance of the target object not shown here. Finally, the 2-D IR image data, the 3-D map and distance information of the object are processed, and explained details as an example in the meta sensor system process chart shown in FIG. 9. and not repeated here. The TT pixel located in substrate 1101 can get the reflected visible radiation and create the 3D map which is visible in visible radiation. To get the visible radiation illuminated onto the TT pixel detector, either total radiation is passing from back side of the substrate 1101 and the IR radiation is reached to the substrate 1103 to sense the IR radiation, or making visible light pass from substrate 1103 to 1101 to sense the visible radiation by TT detector, when total radiation is illuminated to the top side of substrate 1103.

According to this invention, alternatively, in an another embodiment (not shown here), the meta sensor comprises of IR imaging and also IR TT pixel for depth/3D mapping. In that case, the substrate 1103 (not shown here) comprise of detector arrays for both image pixel and also TT pixel, and associated electronics means for readout and/or signal processing can be located in substrate 1101 (not shown here). The substrate 1103 is bonded to substrate in such a way that image pixel and TT pixel contacts in substrate 1101 are contacted to the related detector in 1103. Total radiation is made to illuminated on the top side of substrate 1103. Alternatively, the signal processing substrate 1101 may comprise of several substrates wherein the analog, digital, and/or further processing for decision, or a combination are done in separate substrate (not shown here).

Figure 11B:
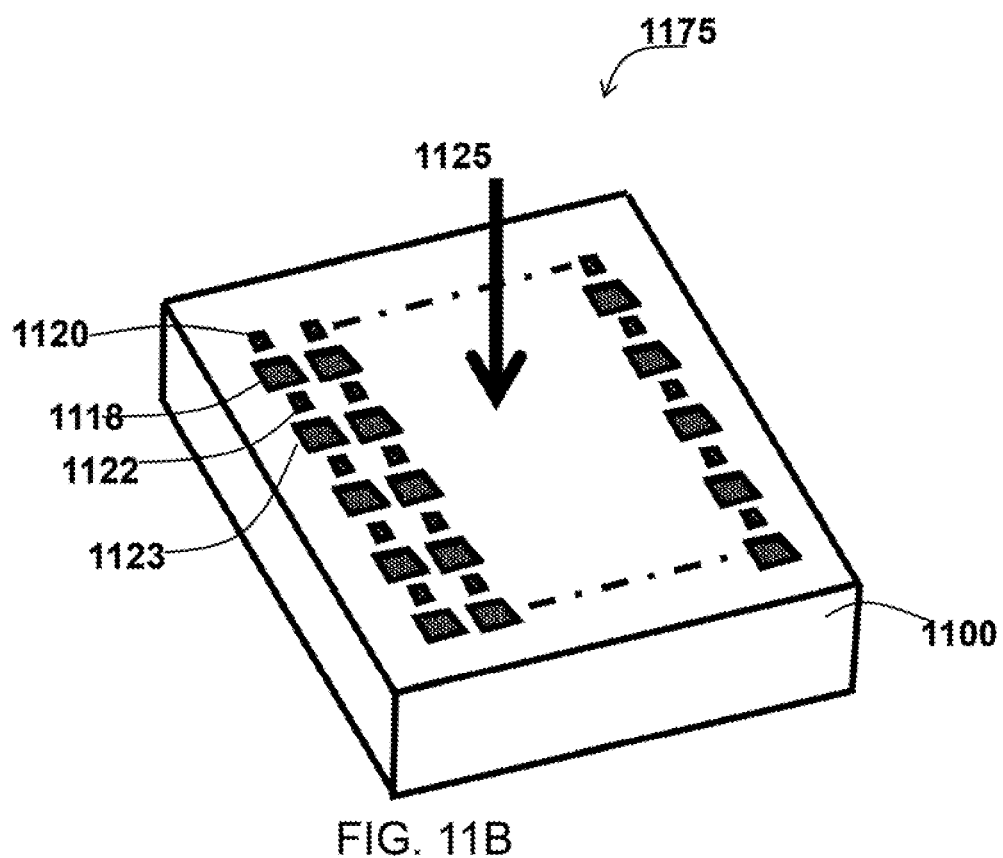
FIG. 11B is a schematic of alternative embodiment of a meta-sensor showing a side view wherein the meta-sensor is made based a single chip or a multiple chips, wherein both optical (especially IR or Visible plus IR) to electrical signal conversion and electronics signal processing are in the same single chip and/or the multiple chips in the preferred embodiment, according to this invention, wherein both 3D mapping and/or depth, and the imaging are in the same spectrum (i.e. Visible and IR, or IR).

FIG. 11B is a schematic, showing a meta sensor in an alternative embodiment, wherein a like numeral represents the like part explained in FIGS. 10A, 10B, and 11A, so that repeated explanation is omitted here. The meta sensor 1175 may comprise of single substrate or multiple substrates 1100 for performing the electronics signal processing, and the detector array for both image pixel and also TT pixel, can be monolithically integrated on to the substrate 1100. For example, material (such as PbS, Pb-salt, colloidal quantum dots) can be deposited or spin-coated directly on to the substrate 1100 to make the detector or photoconductive detector for image pixels (e.g. 1118, 1123) and TT pixels (e.g. 1120, 1122). For material, PbS, Pb-salt, colloidal quantum dots based material, or a combination hereof to make the detector on to substrate 1100. The radiation 1125 makes illuminated to the meta sensor 1175 and its wavelengths can cover UV, Visible to IR.

Figure 11C:
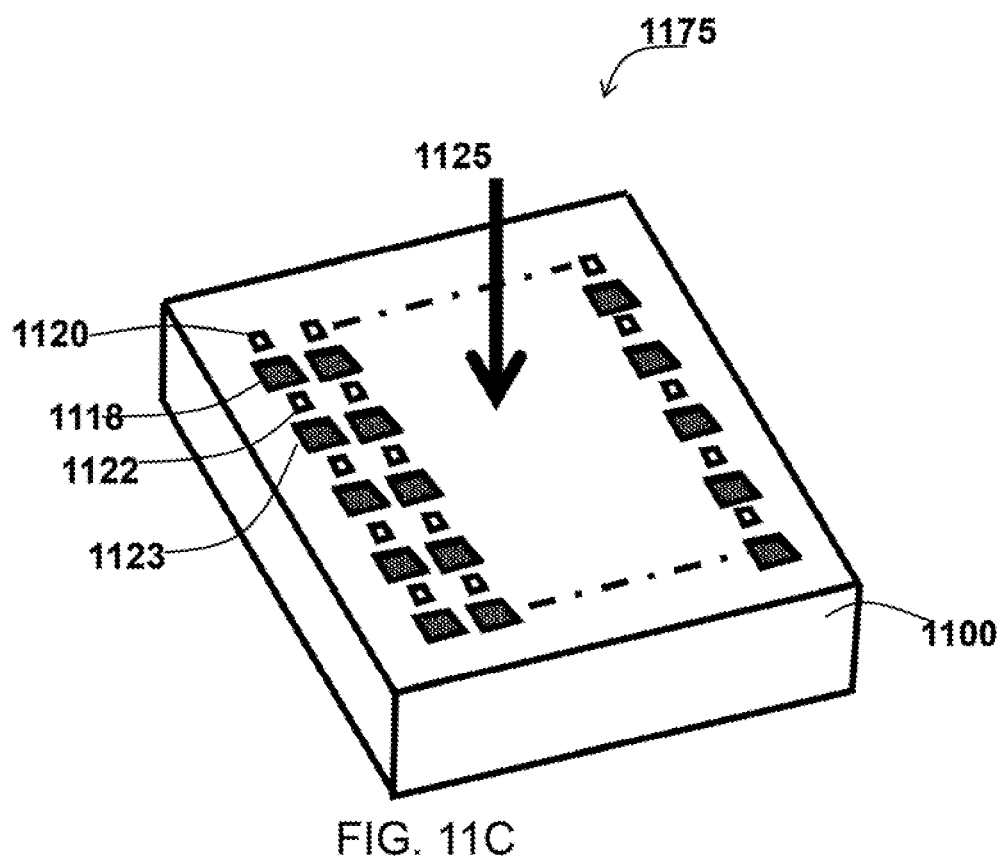
FIG. 11C is a schematic of alternative embodiment of a meta-sensor showing a side view wherein the meta-sensor is made based a single chip or a multiple chips, wherein both optical (especially IR or Visible plus IR) to electrical signal conversion and electronics signal processing are in the same single chip or the multiple chips in the preferred embodiment, according to this invention. The differences between FIGS. 11B and 11C are that, the depth and 3D mapping, and image capture occurs not in the same wavelength band of spectrum, but in a different band of spectrum. For example, the depth and 3D mapping in visible and IR or Visible only spectrum or imaging is in IR spectrum, and vice versa for both cases in terms of spectrum

According to this invention, alternatively, the detector for the imaging pixels, as explained in FIG. 11B, may sense thermal gradient of the object in the scene. FIG. 11C is a schematic, showing a meta sensor in an alternative embodiment, wherein a like numeral represents the like part explained in FIGS. 11A and 11B, so that repeated explanation is omitted here. The image pixel in FIG. 11C is based on the detector to sense the thermal gradient of object in the scene. Other pixel associate in meta sensor is the same those as explained in FIGS. 11A and 11B, so that repeated explanation is omitted here. The imaging type pixels such as 1120, 1122, are sensitive to the detection of thermal radiation 1125 emitted from a object in the scene in the longwave infrared (LWIR) spectrum consisting of wavelengths from 8 µm to more than 15 µm. The detector can be photoconductive type (e.g. a bolometer) or any pn junction type formed directly onto the image pixel contacts in substrate 1100 to sense the thermal gradient of the object in the scene and produce a thermal scene image. Further, the TT type of pixels such as 1120, and 1122 and so on along the N rows and M columns, on the meta sensor 1175 will capture reflected light for travelling time (TT) processing as already explained in more details in FIGS. 1A to 8, and similar explanation is not repeated here. The TT pixel data is used to obtain a 3-D map and distance of the target object not shown here. Finally, the thermal image data, and the 3-D map and distance information of the object are processed as described in details in the meta sensor system process chart in FIG. 9 and the repeated explanation is omitted here.

Figure 11D:
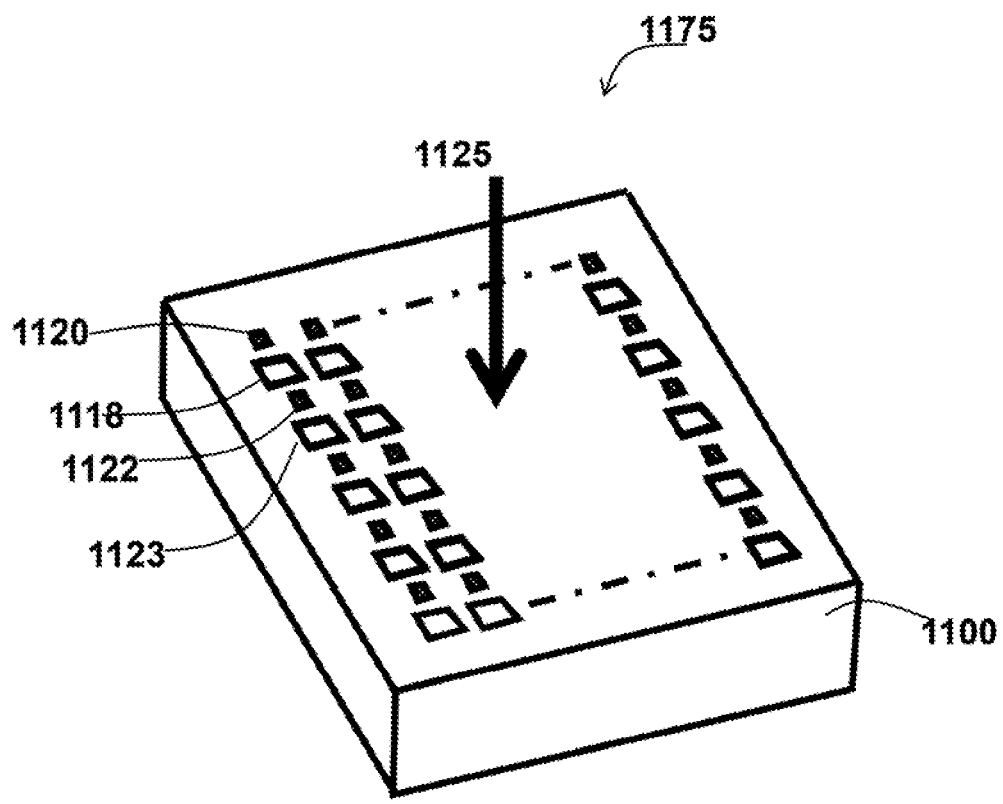
FIG. 11D is a schematic of alternative embodiment of a meta-sensor showing a side view wherein the meta-sensor is made based a single chip or a multiple chips, wherein both optical (especially IR or Visible plus IR) to electrical signal conversion and electronics signal processing are in the same single substrate or in the multiple substrate in the preferred embodiment, according to this invention. The TT pixel detector and Image pixel detector detects different wavelength of radiation or different band of wavelengths.

Alternatively, in an another embodiment, the detector can be formed onto to a substrate either for image pixel or TT pixel by using the material deposited directly onto the substrate 1100. The detector formation using of material on to the substrate can be done using standard clean room process step, so that details are omitted here. Based on the material, the detector detects a specific band of wavelengths which may cover from ultra-violet, Visible, to longwave infrared (e.g. 120 nm to 25 micrometer). For example, the detector for TT pixel can detect the IR spectrum and the detector for image pixel can detect visible spectrum, and the detector for image pixel can be in substrate 1100 wherein the electronics means are located and they can be Si photodetector integrated with electronics means in Si. FIG. 11D is a schematic showing a meta sensor in the alternative embodiment, wherein the similar numeral represent like as explained in FIGS. 11A and 11B, so that repeated explanation is omitted here. The difference between FIGS. 11B and 11D is that TT pixel detector in FIG. 11D is based on IR detector and whereas the image pixel detector is based on Si-photodetector, fabricated along with electronics means using CMOS technology. On the other hands, the difference between FIG. 11C and FIG. 11D is that the image pixel in FIG. 11C is based on the detect to sense the thermal gradient to get thermal image versus the detector in FIG. 11D is Si based detector to get visible image in the scene. The TT pixel detector in both FIGS. 11C and 11D are same.

Figure 12A:
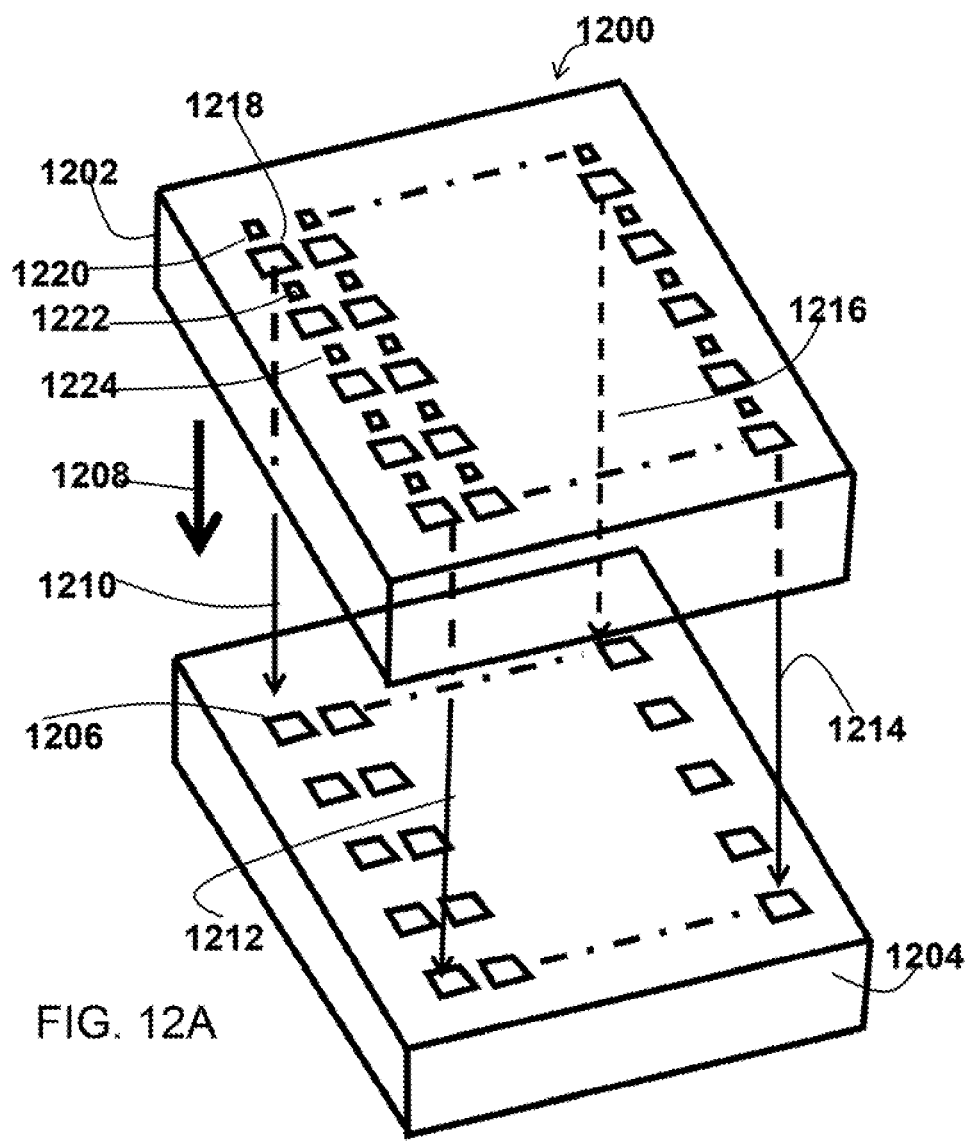
FIG. 12A is a schematic of alternative embodiment of a meta-sensor showing a side view wherein the meta-sensor is made based two or more chips, wherein optical (especially IR or Visible plus IR) to electrical signal conversion is done by a single chip or a multiple chip, and electronics signal processing are done in the single or the multiple chips, and/or another chip or another multiple chips in the preferred embodiment, according to this invention. The differences between FIGS. 11A and 12A are that, the depth and 3D mapping, and image capture occurs not in the same chip and they are in different band of spectrum. For example, the depth and 3D mapping in visible and IR or Visible only spectrum and/or imaging is in IR spectrum. Further, the optical to electrical conversion and electronic signal processing for depth and 3D mapping are both done in a CMOS IC which could be single substrate or multiple substrate, and where as the optical (especially IR band) to electrical signal conversion for image capture is done in different chip, but the electrical signal processing is done in the same CMOS IC.

FIG. 12A is a schematic, showing a meta sensor in alternative embodiment according to this invention. The meta sensor device 1200 comprises a detector array formed located in substrate 1204, wherein the detector array comprises of a 2-dimensional array of pixels of N rows by M columns whereby the pixels 1206 are of the imaging type. Further, the imaging pixels are sensitive to the detection of light in the infrared (IR) spectrum consisting of wavelengths from 0.9 μm to more than 25 μm and made based on the substrate materials used for the detectors located in substrate 1204. The meta sensor 1200 is made from boding of a substrate 1202 having TT pixels and electronics means with detector array substrate 1204 from the top 1208 to the detector contacts located in substrate 1204 such that each pixel 1206 and so on along the n rows and m columns for image pixel array is aligned 1210, 1212, 1214, and 1216 with a corresponding meta sensor's imaging pixel 1218 and so on along the n rows and m columns arrays, on the substrate 1202 of meta sensor 1200. The bonding of a substrate 1202 and the image pixel detector in substrate 1204 makes a meta sensor to enable the IR imaging of the met sensor 1200. Further, the TT type of pixels such as 1220, 1222, 1224, and so on along the n rows and m columns making image pixel arrays, in the meta sensor 1200 will capture reflected light for traveling time (TT) processing as already explained in more details in FIGS. 1A to 2E, and not repeated here. The TT pixel data is used to obtain a 3-D map and distance of the target object not shown here. Finally, the 2-D IR image data, the 3-D map and distance information of the object are processed as described in details in the met sensor system process flow chart in FIG. 9, and the repeated explanation is omitted here.

Figure 12B:
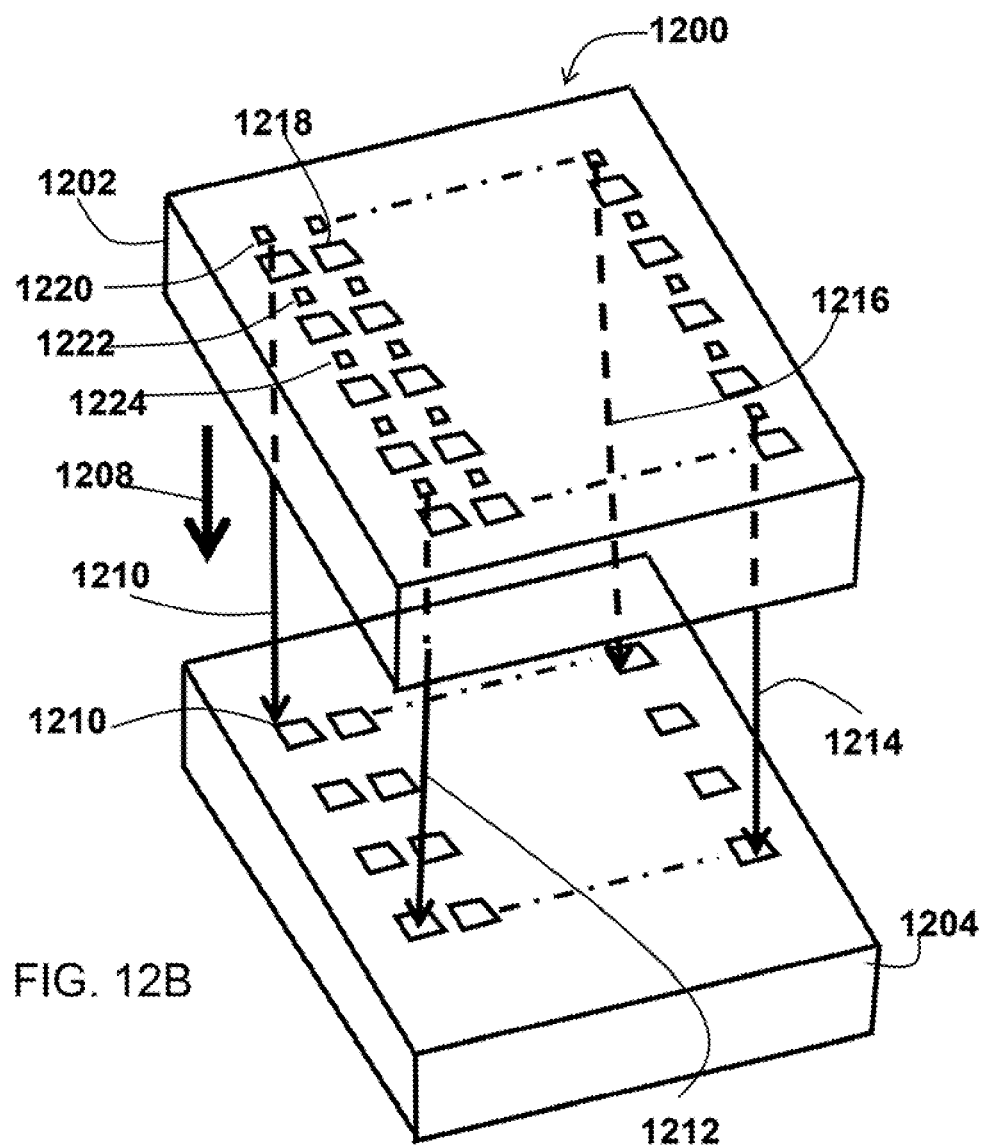
FIG. 12B is a schematic of alternative embodiment of a meta-sensor showing a side view wherein the meta-sensor is made based two or more chips, wherein optical (especially IR or Visible plus IR) to electrical signal conversion is done by a single chip or multiple chips, and electronics signal processing are done in the single or the multiple chips, and/or another chip or another multiple chips in the preferred embodiment, according to this invention. The differences between FIGS. 12A and 12B are that, the depth and 3D mapping, and image capture occurs not in the same chip and they are in different chip and different band of spectrum. For example, the depth and 3D mapping in IR and Visible, or visible only spectrum and/or imaging is in visible spectrum. Further, the optical to electrical conversion and electronic signal processing for visible imaging are both done in a CMOS IC which could be single substrate or multiple substrate, and where as the optical (especially IR band) to electrical signal conversion for 3D mapping and/or depth mapping is done in different chip, but the electrical signal processing is done in the same CMOS IC.

Alternatively, in an another embodiment, the substrate 1202 containing the detector array can be for TT pixel detector, wherein the TT pixel can detect the IR radiation reflected from the object after projected from emitter (not shown here). FIG. 12B is a schematic showing a meta sensor in an alternative embodiment, wherein like numeral represent the like part explained in FIG. 12A, so that repeated explanation is omitted here. The difference between FIG. 12A and FIG. 12B is that the detector array located in substrate 1202 is for the TT pixel wherein the TT sensor can detect the IR radiation reflected from the objects after emitter send the radiation in the scene. Where as in FIG. 12B, the image pixel detector detects visible spectrum and thereby the detector and associated electronics located in substrate 1202 making pixel generates the visible scene image. All other explanation as included in FIG. 12A is same and repeated explanation is omitted here.

In FIGS. 10A to 14B, the emitter is not shown, however, the meta sensor can be combined with the emitter for radiation scanned or projected to the scene to get the reflected radiation for TT pixel. The emitted radiation could be varied from UV, visible, near Infrared, shortwave Infrared, midwave infrared, longwave infrared, or THz radiation, or a combination of thereof. A single emitter or multiple emitter can be used to make the emitted radiation.

Figure 13A:
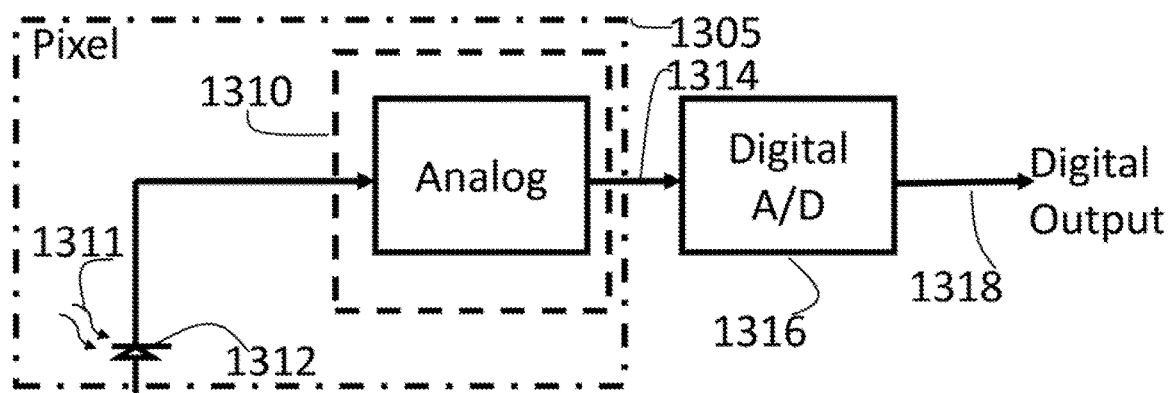
FIG. 13A is a schematic showing block diagram of a meta sensor pixel (i.e. image pixel) circuit block module in the preferred embodiment according to this invention.
Figure 13B:
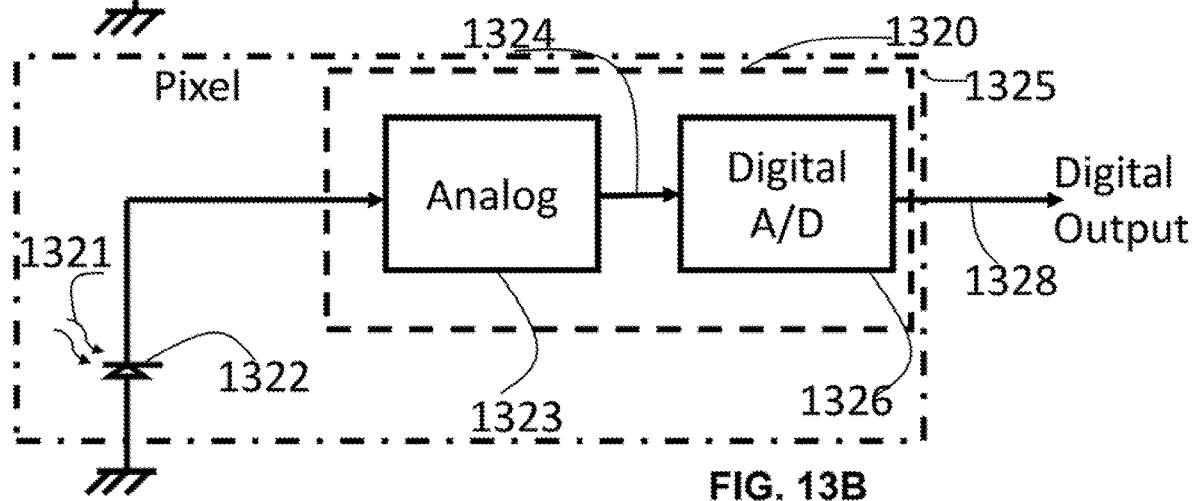
FIG. 13B is a schematic showing block diagram of a meta sensor pixel (i.e. image pixel) circuit block module in an alternative preferred embodiment according to this invention.

The meta sensor pixel for both image and TT sensing, may either provide output in analog signal format or in digital signal format. According to this invention, in way of an example not way of limitation, FIGS. 13A and 13B are schematics showing the block diagrams of signal processing within a pixel (e.g. image pixel) of a meta sensor (explained in FIGS. 10A to 12B) in a preferred embodiment. In FIG. 13A, the pixel 1305 comprises a single circuit block or multiple circuit blocks 1310 and a detector 1312, wherein the circuit block 1310 provides an analog signal output 1314 after processing an electrical signal generated by the detector 1312 after obtaining a reflected or a transmitted radiation 1311 from an object in the scene (not shown here). This analog signal 1314 is then sent to an analog-to-digital (A/D) converter module 1316 outside the pixel where it is converted into a digital output 1318, which constitutes a part of the data stream for further processing. The single circuit or multiple circuit may be used in pixel 1310 before transferring to the A/D converter module 1316 (not shown here) for digital signal output 1318. Single or multiple digital module 1316 may be used for the pixel or the pixels under that column (not shown here). For easiness in explanation, other pixel in a row or a column has not been shown here. The same digital circuit module 1316 may also be connected to the same column to convert the analog signals from the pixels under that column (not shown here). The digital circuit module 1316 for converting to analog signal to digital signal may include, but not limited to successive approximation ADC, flash type ADC, pipeline ADC, dual slope converter ADC, and sigma-delta ADC. According to this invention, in way of an example not way of limitation, each pixel may include further a single circuit or multiple circuits which including, but not limited to, filter circuit to eliminate or reduce the noise, correlated double sampling circuit to reduce noise such as fixed pattern noise, sifting circuit etc.

In another alternative embodiment, as shown in FIG. 13B, pixel (e.g. image pixel) 1325 comprises a single circuit block or multiple circuit blocks 1323, a digital circuit block 1326, and a detector 1312, wherein the circuit block 1323 provides an analog signal output 1324 after processing an electrical signal generated by the detector 1322 after obtaining a reflected or a transmitted radiation 1321 from an object in the scene (not shown here). The digital circuit block or module 1326 provide digital output signal 1328, The analog circuit block 1323 get an electrical signal from an photodetector 1322 after processing a radiation 1321 which may comprises a reflected radiation or a transmitted radiation from an object in the scene (not shown here). The analog signal 1324 is sent to an analog-to-digital (A/D) converter module 1326 (e.g. digital block) inside the pixel or in-pixel where it is converted into a digital signal 1328, which constitutes part of the data stream for further processing. The digital circuit module 1326 for converting to analog signal to digital signal may include, but not limited to successive approximation ADC, flash type ADC, pipeline ADC, dual slope converter ADC, and sigma-delta ADC. According to this invention, in way of an example not way of limitation, each pixel may include further a single circuit or multiple circuits which including, but not limited to, filter circuit to eliminate or reduce the noise, correlated double sampling circuit to reduce noise such as fixed pattern noise, sifting circuit etc. The detector (i.e. 1312 or 1322) as shown in FIGS. 13A or 13B can be connected directly to ground, or any bias point convenient to the pixel circuit to generate electrical signal responding to the reflected radiation or transmitted radiation from the object.

Figure 14A:
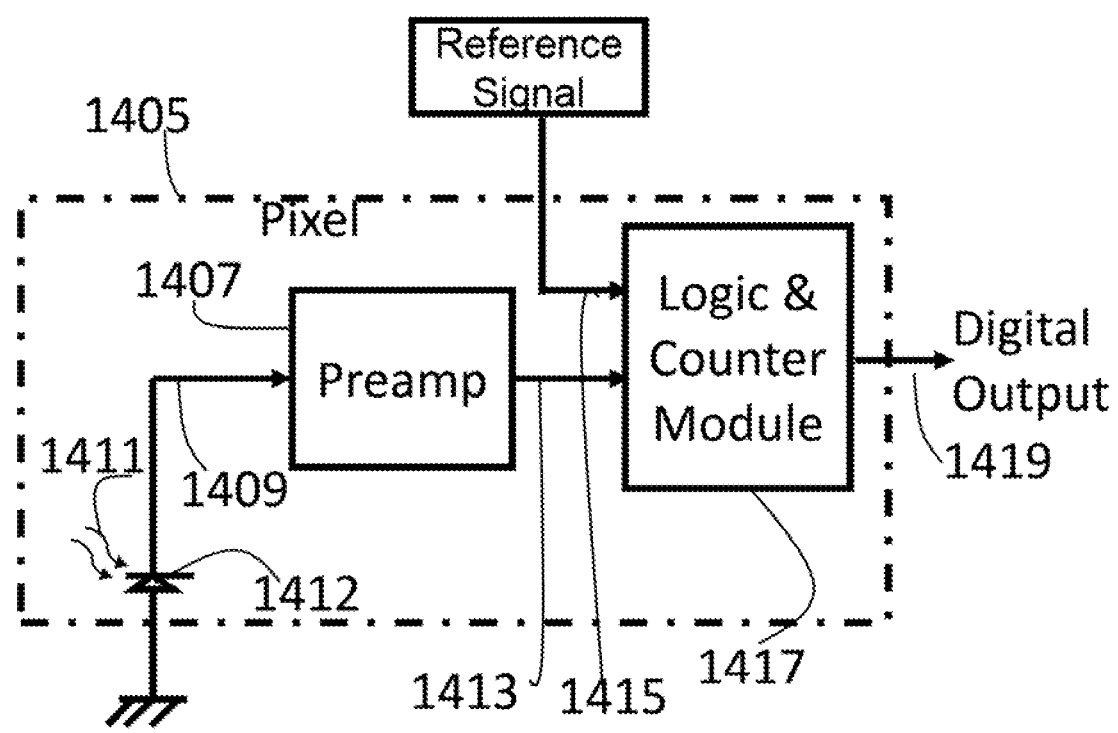
FIG. 14A is a schematic showing block diagram of a meta sensor TT pixel circuit block module in the preferred embodiment according to this invention.

The pixel circuit for a TT pixel can be a circuit type providing a analog output, digital output, or a combination thereof. FIG. 14A is a schematic showing block diagrams of TT pixel circuit block and associated signal processing in the preferred embodiment according to this invention wherein like numerals represent the like parts as explained in FIGS. 13A and 13B, so that repeated explanation is omitted here. According to this invention, in way of an example not way of limitation, each TT pixel 1405 may comprise a detector 1412, receiving a reflected radiation or a transmitted radiation 1411 from a object not shown here, a single or multiple circuit block, and a reference signal. The pixel circuit may further comprise of a preamplifier 1407, and digital circuit block which may includes, but not limited to, a logic and counter circuit module 1417, wherein the preamplifier or a amplifier 1407 may amplify the electrical signal 1409, considered as a photocurrent generated by a detector responding to a radiation 1411 and get the amplified signal 1413. Both the amplified signal 1413 and the reference signal 1414 sends to the logic and counter circuit module 1417 to get a digital signal output 1419, wherein the digital signal output 1419 provides an information related to TT time. The reference signal 1415 is a signal associated with and/or related to a signal, generating the emitting radiation (not shown here). According to this invention, in way of an example not way of limitation, the signal (e.g. reference signal) generating the emitting radiation may be continuous, pulse with a specific period and specific pulse width, or a combination thereof. The logic and counter module compares the radiation pulse signal 1415 (as a reference signal) with that of the reflected radiation pulse signal 1415 and estimates a delay of the reflected radiation 1411 illuminating on to the detector 1412, after generating emitted radiation (not shown here). The delay time of a reflected radiation from a corresponding emitted radiation provide an information of the distance (i.e. range) between the object and meta sensor, and also provide precisely curvature, 3D object surface, 3D mapping of the scene, or a combination thereof following signal processing. Further, with collecting of delay time information from each and every TT pixel, located in row and column, will provide curvature of objects (i.e. 3D mapping, 3D shape) in a scene, as explained earlier. According to this invention, in way of an example not way of limitation, the meta sensor can be located in autonomous system, including, but not limited to, aerial vehicle, ground vehicle, robotic system, to provide clear vision with perception to obtain decision (i.e. like human) to transmit to the control system to act accordingly.

Figure 14B:
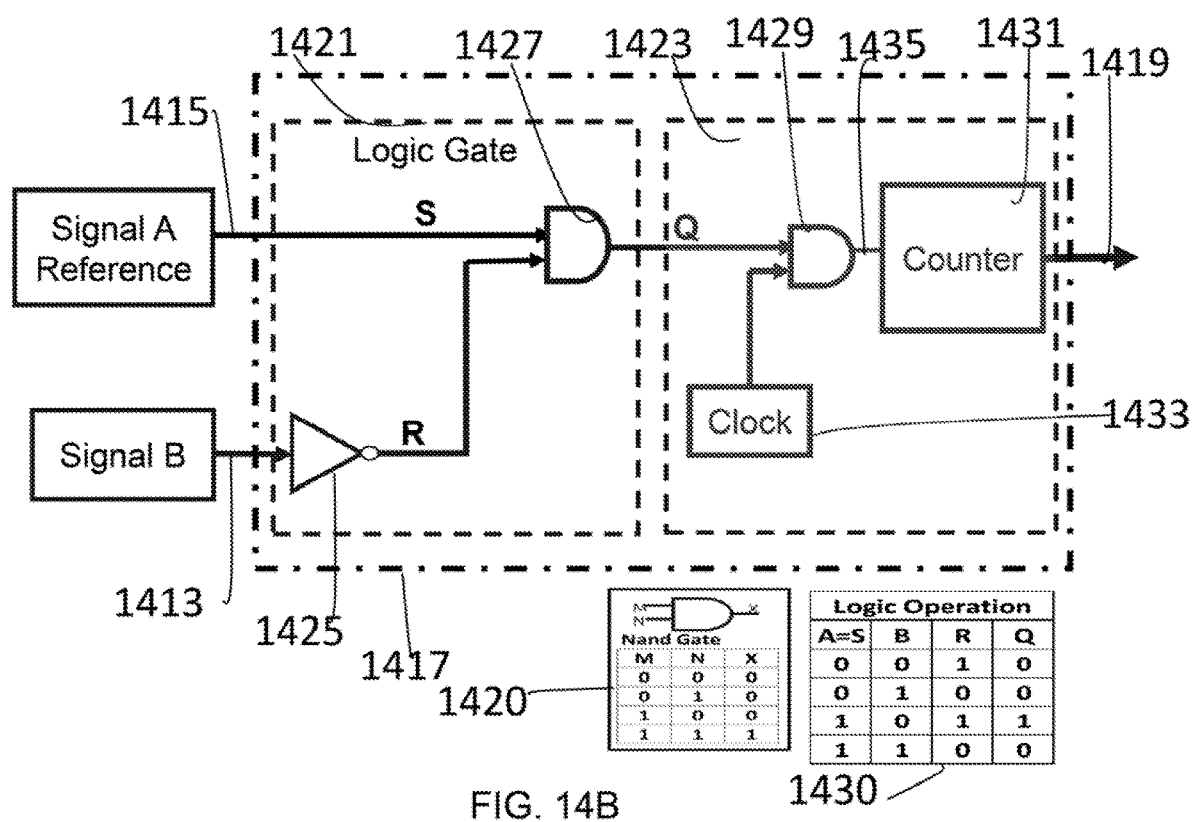
FIG. 14B is a schematic showing block diagram of a part of TT pixel as shown in FIG. 14A, in the preferred embodiment according to this invention.

The TT pixel circuit block can be designed in various way to get information from each and every TT pixel in array (e.g. 1D or 2D format) to generate the 3D object information, range, and/or 3D mapping. In way of an example not way of limitation, each pixel may be designed using logic and counter module to obtain the delay time of reflected radiation with respect to the emitted radiation, mentioned earlier. FIG. 14B is a schematic, showing block diagrams of a TT pixel in a meta sensor in the preferred embodiment, wherein like numerals represent the like parts as explained in FIG. 4A, so that repeated explanation is omitted here. For easiness in explanation, in FIG. 14B, signal A and signal B represent a reference signal or a signal associated with a reference signal (explained in FIG. 14A) 1415, and signal 1413 created by a reflected radiation from an object in the scene (also explained in FIG. 14A), respectively. A TT pixel (e.g. 1405 in FIG. 14A) may comprise of a detector (not shown here), and a logic gate and counter module 1417, wherein the logic gate and counter module 1417 further comprises a logic gate module 1421, and a counter module 1423, wherein the detector provides electrical signal 1413 (i.e. signal B) corresponding to a reflected radiation, and wherein the logic gate module further comprises an inverter 1425 and a AND gate 1427, wherein the signal B 1413 (signal corresponding to reflected radiation) send to the input of the inverter 1425, and the signal A 1415 (treated as reference signal) send to the input of the AND gate 1427. The counter module 1423 may comprise of a AND gate 1429, a counter 1431, and a signal 1433 to be input to the AND gate 1429. The signal A (i.e. S in FIG. 14B) and the signal B input to the logic gate module 1421 provide an output Q (in FIG. 14B), wherein one input to the logic gate module 1421 is the Signal A 1415 (also shown as Signal S in FIG. 14B) and other input to logic gate module 1421 is an inverted signal (also shown as Signal R in FIG. 14B) of the signal B 1413, which provide an output signal of Q, according to logic operation as mentioned in 1420 and 1430. The output signal Q and clock signal 1433 are sent to the AND gate 1429, as inputs and provide a output signal 1435 which sends to the counter 1431 to provide a digital output 1419. The n-bit counter can be used as the counter 1431, (wherein n is an even number). Any clock having a rate (period and pulse width) can be used as an input to the counter, is dependent on the application. For example if clock rate of 1 GHz is used, corresponding clock period is 1 ns ($=1/10^9$), the delayed time for the reflected radiation counting 2 by the counter, is 2×1 ns=2 ns. The pulse associated with the emitted radiation may cover from second (sec) to picosecond, based on the range of object to be measured and also based on the 3D mapping resolution or 3D object feature in details to measure. After processing the signal 1419, the 3D mapping, 3D objects in a scene, range etc. can be done and measured in a real time or close to a real time. According to this invention, in way of an example not way of limitation, a shift register can be used to shift the TT data or signal from each TT pixel along the column to further process the output data from TT pixel to obtain the range, 3D mapping, 3D image etc. (not shown here).

Figure 14C:
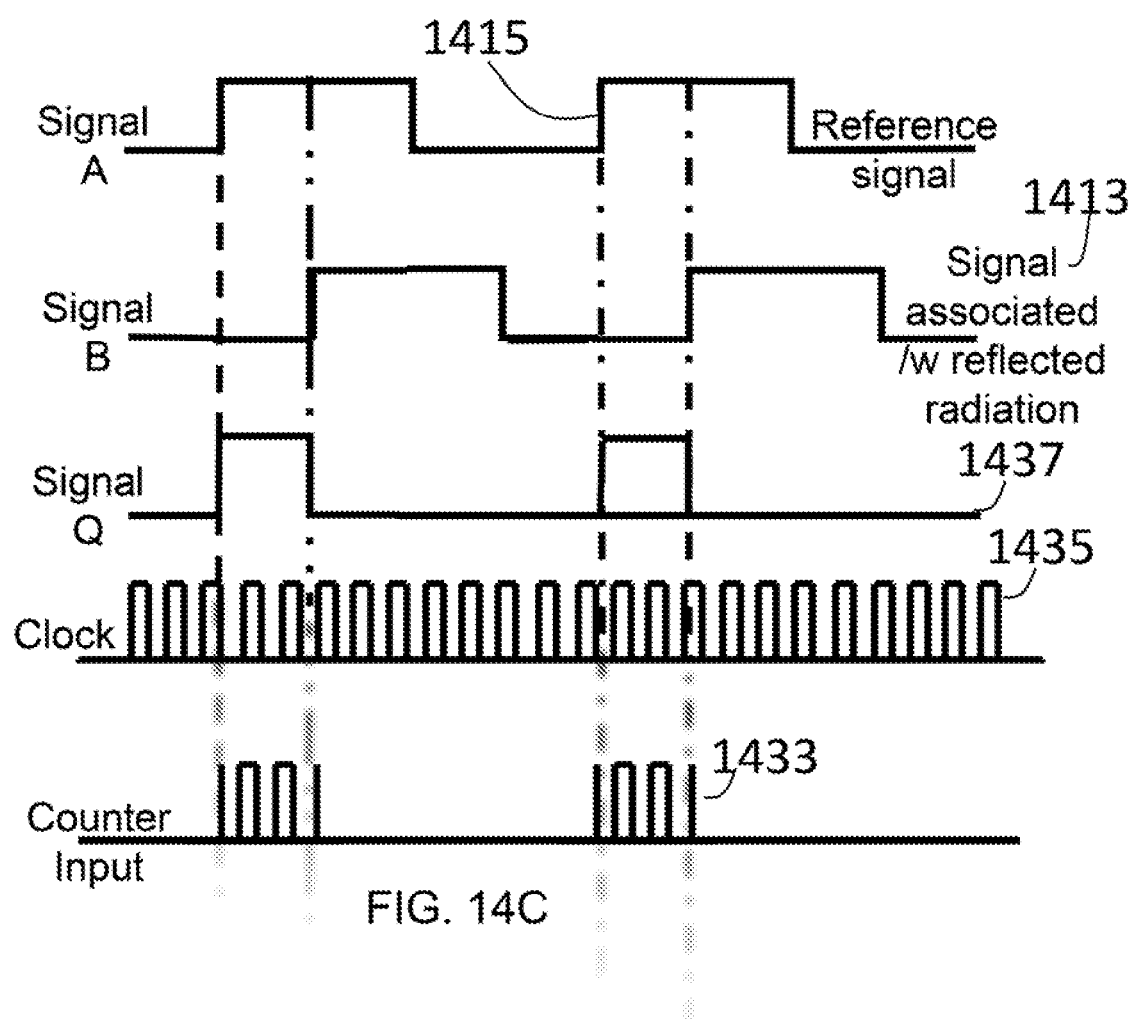
FIG. 14C is an illustration showing signals those are created during signal processing in the circuit block module shown in FIG. 14B to achieve the delayed time in the preferred embodiment according to this invention.

FIG. 14C is an illustration, showing the signal processing (in/out) in each block, as shown and explained in FIG. 14B, in the preferred embodiment wherein the like numerals represent the like part, as explained in FIGS. 14A and 14B, so that repeated explanation is omitted here. According to this invention, in way of an example not way of limitation, the reference signal 1415 generating a emitted radiation (not shown here) have pulse in nature, having a desired pulse width and a period, which is dependent on the application and also the circuit blocks. The reference signal 1415 and the signal 1413 associated with the reflected radiation, provide an output signal Q 1437 from a logic gate module (1421 in FIG. 14B). After sending a clock signal 1433 and the output signal 1437 to an AND gate (1429 in FIG. 14B), provides an output signal 1433 which afterwards is sent to the counter, the output of which provides an information of delayed time of the reflected radiation with respect to the reference signal associated with the emitted radiation. The delayed time is a time travelling the emitted radiation to a point on an object and the time of returning of a radiation after reflection from the point on the object to a TT sensor pixel. According to this invention, in way of an example not way of limitation, the time required to return the radiation after reflection to the detector, mentioned in FIGS. 13A to 14B is almost the same as a time required to send the emitted radiation to the point of the object from the emitter. Once the travelling time is known, the distance of the object and 3D feature of the object in a scene can also be known. The emitter and meta sensor may be located is close proximity to the meta sensor or a distance which is close to the meta sensor and also dependent on the application.

Figure 15A:
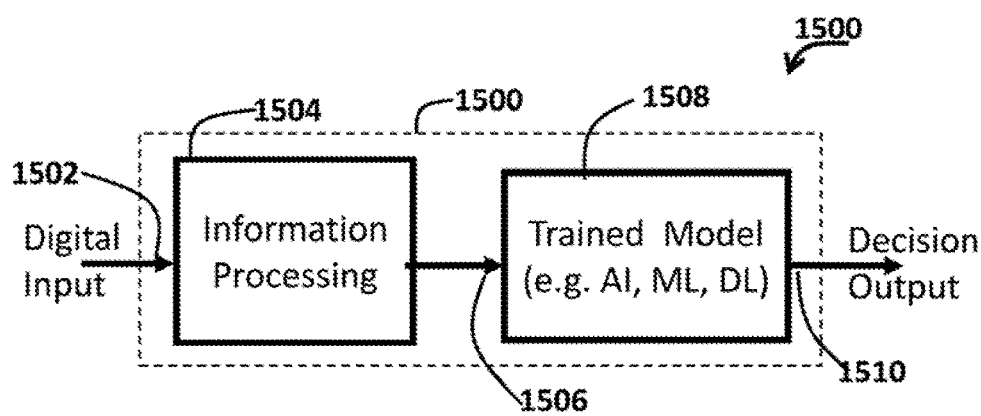
FIG. 15A is a schematic showing block diagram of an electronic mean and its associated sections in a meta sensor in the preferred embodiment according to this invention.

FIG. 15A is a schematic showing block diagrams of signal processing unit for further signal/data processing after pixel array, in the preferred embodiment according to this invention. In FIG. 15A, the data stream is further processed using an electronic means or multiple electronic means 1500, wherein the output of digital signal 1502 (i.e. 1318 in FIG. 13A and 1328 in FIG. 13B, or 1429 in FIG. 14A) is sent to a signal processing module 1504 (i.e. electronic mean 1500), which comprises at least one section, wherein at least one section processes the signal from a meta sensor pixel to provide a attribute of the multiple modalities. The attributes are dependent on to type of sensors integrated into a meta sensor, and that attributes include, image, their associated depth, 3D mapping, 3D object image, 3D cloud points, and distance. The processing unit 1500 may be a electronic mean which may include, but not limited to, FPGA, digital-signal processing (DSP), processor, microcontroller, or combinations thereof. The signal processing can be performed serially or in parallelly to provide output 1506. The processing unit may further comprise an another unit similar to the at least one section mentioned earlier, wherein a trained model are stored and the output signal 1506 is sent to single trained model or multiple trained models 1508 where interim or final decisions are made or evaluated as described in details in FIG. 9, and those explanation are not repeated here. The output 1510 from trained model unit 1508 is a decision and thereafter sent to a control unit to act. Trained model may comprise of a model or multiple model, that was created or achieved after training from a set or multiple set of datasets and training is done using AI, machine learning, deep learning, or/and combination thereof. Training can be done in offsite of meta sensor. Alternatively, meta sensor may comprise of further a unit (e.g. processor, GPU etc.) which could do also the training while the meta sensor is in operation. The datasets that may be necessary for performing the training could be obtained remotely or to the stored device which may be connected to the meta sensor.

Figure 15B:
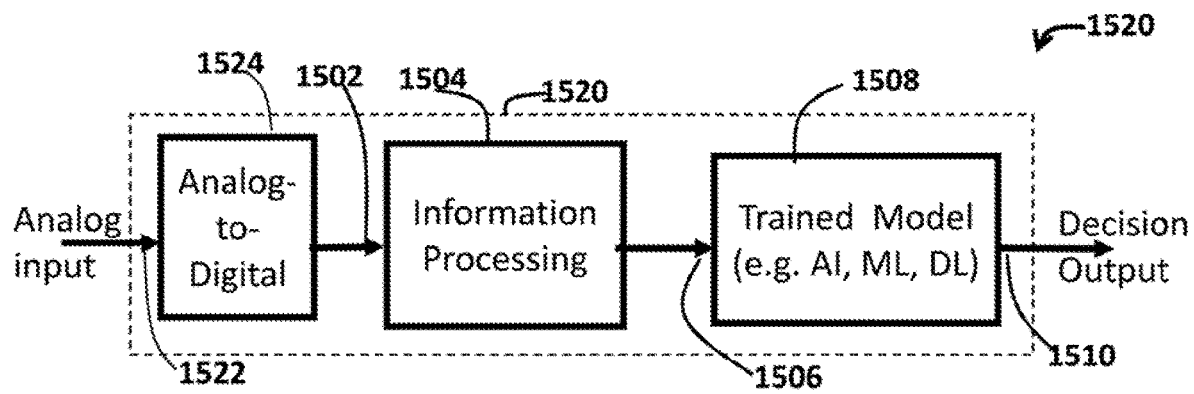
FIG. 15B is a schematic showing block diagram of an electronic mean and its associated sections in a meta sensor in an alternative embodiment according to this invention.

According to this invention, in way of an example not way of limitation, alternatively, the processing unit may comprise further a analog-to-digital module, if the data stream from a meta sensor array is in analog format. FIG. 15B is a schematic showing block diagrams of signal processing unit for further signal/data processing after pixel array, in an alternative preferred embodiment according to this invention, wherein the like numerals represent the like parts explained in FIG. 15A, therefore the repeated explanation is omitted here. The main difference in FIG. 15B as compared with FIG. 15A is that an analog data stream 1522 from a meta sensor pixel array is sent to an analog-to-digital (A/D) converter module 1524 where it is converted into a digital output, wherein electronic mean comprise a analog-to-digital module 1522 in addition to others explained in electronic mean 1500 in FIG. 15A.

According to this invention, in way of an example not way of limitation, the trained model mentioned earlier can be made by training through datasets and can be done inside a system, or offsite of the system, or partly inside a system and partly outside of a system (hence system means meta sensor system (combining of a meta sensor and associated hardware). In a case whereby the trained mode is made out of meta sensor system, the trained model can be transferred by a way, including but not limited to, via internet, private network, by a peripheral means (e.g. USB, flash-drive etc.), or combinations thereof. The trained model can be updated using a similar way either directly to the system or offsite of the system, as described.

In FIGS. 10A to 14B, the detector to sense/detect the radiation and converting to the electron and thereby electrical current, can be made of any material, including but not limited to, Si, Ge, InP, GaAs, GaSb, HgCdTe, HgTe, GaN, ZnO, CdTe, PbS, ZnS, or a combination of thereof. The detector for both image pixel and TT pixel are the same type of detector and made from a same type of material (i.e. Si photodetector) or different type of material, to sense/detect the radiation of any wavelengths. Alternatively, a photodetector or multiple photodetector can be used for both Imaging pixel and/or TT pixel, converting the optical signal to electronic signal. The photodetector can be made from the material mentioned above to convert the optical to electronics signal, and the photodetector can be made from a p-n junction, p-i-n junction, Schottky junction or a combination thereof. Alternatively, the optical to electronic signal can be made using a or multiple detector based on photoconductive type. The detector can be monolithically integrated on a single substrate with electronic means processing the electronic signal or hybridly integrated with the electronics means in a separate substrate and afterwards, bonding by using a method for example chip-to-chip bonding, or flip-chip bonding (not shown here). According to this invention, in way of an example not way of limitation, alternatively, the photodetector receiving reflected radiation from an object in the scene can be senses by using of a same type of photodetector or different type photodetector. For example, photodetector in image pixel and TT pixel can detect the same or different radiations having a band of wavelengths radiation. Alternatively, filter can be used in front of photodetector to detect different band of wavelengths, and the same type of detector can be used for both image pixel and TT pixel. Further, the radiation mentioned here, covers a band or multiple bands, including but not limited to, x-ray, ultra-violet, visible, near infrared, shortwave infrared, midwave infrared, longwave infrared, radiowave, microwave, or a combination of thereof.

According to this invention, in way of an example not way of limitation, the detector for image pixel and/or TT pixel may made from a material of Colloidal Quantum Dots (CQD), and those can be made directly onto the integrated chip (that process the electrical signal coming originated from a sensor) of the meta sensor by using suitable thin-film based or solution-processed CQD material for detector whether they are in visible spectrum detector and/or infrared radiation spectrum detection. The CQD based detector or detector array are fabricated directly on silicon (Si) substrates containing the IC for signal processing through various techniques including, but not limited to spin coating directly on the IC devices. Alternatively, the CQD based detector or detector array may also formed on the second substrate and later bonded to the Si—IC substrate (not shown here).

The meta sensor as shown in FIGS. 10A to 15B, may comprises of a selection of various substrate materials suitable for fabricating integrated circuit devices including visible imaging devices including, but not limited to silicon (Si), and the pixels comprises of one-dimensional 1×M (not shown here), or a 2-dimensional array of pixels of N rows by M columns, or N rows by N columns, (wherein N and M are the integer number). In FIGS. 10A to 14B, the meta sensor comprise of image pixel and TT pixel to get scene image and 3D mapping/image depth, and distance simultaneously in parallel or serially (based on the signal processing scheme adopted). Alternatively, and further, in an another embodiment, the met sensor may comprise of pixels, (whether single element or multiple elements for specific function sense), including but not limited to image pixel, TT pixel, radar, ultrasonic, other sensor, or a combination thereof, and the pixels of several type sensors may be arranged in various configurations of pixels whether as a single element or in arranged in array to sense/detect specific function. For example, in FIGS. 10A to 14B, the imaging type pixels and TT type pixels are arranged in an alternating pattern throughout the N×M sensor array. Alternatively, the pixel arrangement for various type sensor pixel can be arranged also in array, wherein each sensor is located side-by-side and placing one after another and/or single type or more than single type sensor may be arranged side by making pixel single M×N or multiple M×N array of pixels, placing each pixel array of 1D or 2D placing in close proximity. Further, the pixels comprise of analog pixels or digital pixels to reduce a signal processing time of the data stream.

According to this invention, as shown in FIGS. 10A and 15B, in way of an example not way of limitation, the meta sensor as shown is a combination of image sensor and TT sensor (herein after also mentioned as, combined image and TT sensor (CITT)), which may be bonded with a single or multiple integrated circuit (IC) device or chips, made using a single or multiple silicon substrates. The silicon IC is comprised of a 1-dimensional or 2-dimensional array of electrical contacts of N rows by M columns corresponding to the detector and/or sensor array (either in a single substrate or in multiple substrate, or in the same Si—IC substrate) of N rows by M columns. The detector and/or sensor contacts located in another substrate are bonded to the 1-D or the 2-D array of electrical contacts of a single Si—IC substrate or multiple Si—IC substrates forming the CITT sensor (i.e. meta sensor). The bonding is done by means of techniques including, but not limited to through silicon via (TSV), chip-to-chip interconnects, and/or flip-chip-bonding, in such that each CITT imaging pixel and so on along the N rows and M columns is aligned with a corresponding image pixel contact and so on along the N rows and M columns of CITT sensor. The CITT sensor may have a digital output or analog output.

According to this invention, in way of an example not way of limitation, alternatively, the meta sensor (or CCIT sensor) comprises a multiple Si integrated circuit in a single substrate or a multiple substrate containing electrical signal processing ICs to reduce the electrical signal processing time.

For example, one integrated circuit in a single substrate can process for analog signal and/or other integrated circuit in a separate substrate can process digital signal. Multiple substrates making meta sensor or CCIT sensor, bonded together (not shown here) using chip to chip interconnects, substrate to substrate bonding, flip-chip bonding, or a combination thereof. Alternatively, in an another embodiment, multiple Si-chip substrates contain preprocessing electronics means, and/or electronics means for processing machine learning models, and/or processing training model (not shown here in bonding aspect), as described in FIGS. 4 to 8, and not repeated here. Alternatively, multiple Si-substrates, wherein each Si-substrate or more than one Si-substrate may process electrical signal coming from single type and/or multiple type of sensor.

According to this invention, in way of an example not way of limitation, the image pixel data is used to obtain a 2-D scene image of the target, based on a reflected radiation from object or transmitted radiation from an object (e.g. thermal image case) which Is not shown here. On the other hands, in way of an example not way of limitation, TT type of pixels array, along the N rows and M columns in the CITT sensor will capture reflected light from the object and processing a traveling time (TT), as already explained in more details earlier and not repeated here. The TT pixel data is used to obtain a 3-D map/image depth, and distance of the target object not shown here. Finally, the 2-D IR image data, the 3-D map and distance information of the object are processed as described in details in meta sensor (i.e. CITT) system process flow chart in FIG. 9 and not repeated here.

According to this invention, in way of an example not way of limitation, the decision information as described earlier, is to be sent to the control system to act, wherein this decision information can be sent either by wired or by wireless via rf or sensor network, or via private network inside the system or a combination thereof. Alternatively, in an another embodiment, additional Single or multiple systems may be required not shown here to send to the control system. Alternatively, in another embodiment, the decision can also be sent either displaying in the display and/or transmitted through audio generated message (not shown here).

According to this invention, in a way of example but not a way of limitation, alternatively in an another embodiment, a meta sensor may comprise of sensors, including but not limited to, image pixel (in array), TT pixel (in array), ultrasonic (single element or multiple elements), and radar (single element or multiple elements), ultra-sound sensor (single element or multiple elements), or a combination thereof, not shown here. All sensors or a part of listed sensors mentioned herein may make the meta sensor, and they may be formed onto a single substrate (or carrier) or multiple substrates, and later on hybridly interconnected/ bonded to each substrate forming a single stack or multiple stacks. Furthermore, alternatively, they are hybridly integrated on the common platform in various ways. One of the example could be multi-chip-module (MCM).

According to this invention, in a way of example but not a way of limitation, in a preferred embodiment, optics comprising of single lens or multiple lens may be used in the meta sensor, either to focus a reflected radiated beam or transmitted radiation from a point of an object (in a scene) to the meta sensor, or sending a radiation from emitter, located closely proximate to the meta sensor, or a combination thereof. The optics can be fixed or movable, or a combination thereof, to obtain optimum illumination to the meta sensor or optimum illumination to the object. The lens mentioned could be ball lens, convex lens, concave lens, spherical, or a combination there of to achieve maximum performance. Alternatively, the optics could also be included with discrete filter and/or with coating for filter to get the desired wavelengths and/or band of wavelengths.

According to this invention, in a way of example but not a way of limitation, image pixel element and TT pixel element may be formed in such a way that image pixel element and TT pixel element get the same wavelengths, and/or different wavelength. Alternatively, in another embodiment, the image pixel element in array may get also different wavelengths or band of wavelength for the image pixels array. Separate wavelength or band of wavelengths may be for some pixels located nearest neighbors. Similar way could be thought for the TT pixels. Signal processing would provide various wavelength information for example for both image and/or also for 3D depth images According to this invention, in a way of example but not a way of limitation, it is the objective to reduce the processing and also AI/ML processing to achieve the decision at the central unit, located away from the sensor. It is the object of this invention to do all or most of signal processing or data processing and also related AI/ML to decision making at the point of sensing. This eliminate the issue of delay that occurs during the transmission and receiving at the central unit due to the bandwidth limitation during transmission, and thereby eliminating the closing of the data. Further it is an object of this invention to perform local signal or data processing and decision making at the point of sensing or total signal processing including data processing at the point of sensing and the minimal data processing at the central unit.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

The embodiments are chosen and described in order to explain the principles and applications of the invention, thereby allowing others skilled in the art to utilize the invention in its various embodiments and modifications according to the particular purpose contemplated. The scope of the invention is intended to be defined by the claims appended hereto and their equivalent.

As used in this application, the terms "component" and "system" are intended to refer to a computer-related entity, either hardware, a combination of hardware and software, software, or software in execution. For example, a component can be, but is not limited to being, a process running on a processor, multiple processors, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

The following discussion is intended to provide a brief, general description of suitable processor-based devices or systems in which the various aspects can be implemented. Those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other processor-based configurations, including single-processor or multiprocessor systems, as well as personal computers, hand-held computing devices, microprocessor-based or programmable consumer electronics, and the like, each of which can be operatively coupled to one or more associated devices.

A processor-based system typically includes a variety of computer-readable media. Computer-readable media can be any available media that can be accessed and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the communication device or computer.

The system is operable to communicate with any wireless devices or entities operatively disposed in wireless communication, for example, a printer, scanner, desktop and/or portable computer, portable data assistant, communications satellite, other hubs, mobile phones, any piece of equipment or location associated with a wirelessly detectable tag (e.g., a kiosk, news stand, restroom), and telephone. This includes at least Wi-Fi, WiMax, and Bluetooth™ wireless technologies, for example. Thus, the communication can be a predefined structure as with a conventional network or simply an ad hoc communication between at least two devices.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A sensor comprising:
   more than one pixel, wherein the more than one pixel comprises:
      at least one pixel of first type;
         wherein the at least one pixel of first type received a radiation from a object and provide a signal of first type, and;
      at least one pixel of second type,
         wherein the at least one pixel of second type receives a reflected radiation from the object and provide a signal of second type;
      wherein the more than one pixels are arranged in one-dimensional or 2-dimensional array in row and column;
   at least one signal processing unit,
      wherein the at least one signal processing unit received the signal of first type and/or the signal of second type to provide a image information of the object and a distance and a 3-dimensional image information of the object.

2. The sensor of claim 1, wherein the more than one pixels are arranged in a next neighbor configuration, wherein the at least one pixel of second type is located in close proximity to the at least one pixel of first type.

3. The sensor of claim 1, further comprising at least one radiation emitter, wherein the at least one radiation emitter emits a radiation, wherein the radiation emitted from the at least one radiation emitter reflects from an object and wherein the reflected radiation is detected by the at least one pixel of second type and/or by the at least one pixel of first type.

4. The radiation of claim 3, has a single or multiple wavelengths, wherein the single or multiple wavelengths are selected from a group consisting of ultraviolet (UV), visible, infrared (IR), or a combination thereof.

5. The sensor of claim 3, wherein the at least one radiation emitter emits radiation periodically at fixed intervals and/or continuously.

6. The sensor of claim 1, wherein the at least one pixel of first type and/or at least one pixel of second type are sensitive to a single wavelength or band of wavelengths.

7. The sensor of claim 1, further comprising at least one electronic means, wherein the at least one electronic means process the image information of the object, the distance information, the 3-dimensional image information of the object, or a combination thereof.

8. A sensor comprising:
   more than one pixel, wherein the more than one pixel comprises:
      at least one pixel of first type,
         wherein the at least one pixel of first type received a radiation from a object and provide a signal of first type, and;
      at least one pixel of second type,
         wherein the at least one pixel of second type receives a reflected radiation from the object and provide a signal of second type;
      wherein the more than one pixels are arranged in one-dimensional or 2-dimensional array in row and column;
   at least one radiation emitter, and;
   at least one signal processing unit,
      wherein the at least one signal processing unit received the signal of first type and/or the signal of second type to provide a image information of the object and a distance and a 3-dimensional image information of the object.

9. The sensor of claim 8, wherein the more than one pixels are arranged in a next neighbor configuration, wherein the at least one pixel of second type is located in close proximity to the at least one pixel of first type.

10. The at least one radiation emitter according to claim 8, wherein the at least one radiation emitter emit a radiation having a single or multiple wavelengths, wherein the single or multiple wavelengths are selected from a group consisting of ultraviolet (UV), visible, infrared (IR), or a combination thereof.

11. The sensor of claim 8, wherein the at least one radiation emitter emits radiation periodically at fixed intervals and/or continuously.

12. The sensor of claim 8, wherein the at least one pixel of first type and/or at least one pixel of second type are sensitive to a single wavelength or band of wavelengths.

13. The sensor of claim 8, further comprising at least one electronic means, wherein the at least one electronic means process the image information of the object, the distance information, the 3-dimensional image information of the object, or a combination thereof.

14. A sensor comprising:
   more than one pixel, wherein the more than one pixel comprises:
      at least one pixel of first type,
         wherein the at least one pixel of first type received a radiation from a object and provide a signal of first type;
      at least one pixel of second type,
         wherein the at least one pixel of second type receives a reflected radiation from the object and provide a signal of second type;
      wherein the more than one pixel are arranged in one-dimensional or 2-dimensional array in row and column, and;
      at least one pixel of third type;
   at least one radiation emitter, and;
   at least one signal processing unit,
      wherein the at least one signal processing unit received the signal of first type and/or the signal of second type to provide a image information of the object and a distance and a 3-dimensional image information of the object.

15. The sensor of claim 14, wherein the more than one pixels are arranged in a next neighbor configuration, wherein the at least one pixel of second type is located in close proximity to the at least one pixel of first type and/or the at least one pixel of third type.

16. The at least one radiation emitter according to claim 14, wherein the at least one radiation emitter emit a radiation having a single or multiple wavelengths, wherein the single or multiple wavelengths are selected from a group consisting of ultraviolet (UV) visible, infrared (IR), or a combination thereof.

17. The sensor of claim 14, wherein the at least one radiation emitter emits radiation periodically at fixed intervals and/or continuously.

18. The sensor of claim 14, wherein the at least one pixel of first type and/or at least one pixel of second type are sensitive to a single wavelength or band of wavelengths.

19. The sensor of claim 14, wherein the at least one pixel of third type is sensitive to a radiation different from the radiation emitted from the at least one radiation emitter.

20. The sensor of claim 14, further comprising at least one electronic means, wherein the at least one electronic means process the image information of the object, the distance information, the 3-dimensional image information of the object, or a combination thereof.

\* \* \* \* \*